US012762348B2

(12) United States Patent
Ma et al.

(10) Patent No.: US 12,762,348 B2
(45) Date of Patent: Oct. 13, 2026

(54) MANAGING MULTI-SESSION CONTEXTS AND COMMUNICATIONS USING LANGUAGE MODELS

(71) Applicant: ASAPP, INC., New York, NY (US)

(72) Inventors: Tao Ma, Mountain View, CA (US); Hugh Nicholas Perkins, New York, NY (US); Mitchell Steven Morgan, Cedar Park, TX (US); Michael Griffiths, Brooklyn, NY (US); Satchuthananthavale Rasiah Kuhan Branavan, Caterham (GB); Kilian Quirin Weinberger, Ithaca, NY (US)

(73) Assignee: ASAPP, INC., New York, NY (US)

( * ) Notice: Subject to any disclaimer, the term of this patent is extended or adjusted under 35 U.S.C. 154(b) by 86 days.

(21) Appl. No.: 18/759,589

(22) Filed: Jun. 28, 2024

(65) Prior Publication Data

US 2025/0232126 A1 Jul. 17, 2025

Related U.S. Application Data

(60) Provisional application No. 63/632,635, filed on Apr. 11, 2024, provisional application No. 63/552,285,
(Continued)

(51) Int. Cl.
*G06F 40/35* (2020.01)
*G06F 40/166* (2020.01)
(Continued)

(52) U.S. Cl.
CPC ............ *G06F 40/35* (2020.01); *G06F 40/166* (2020.01); *G06F 40/40* (2020.01); *H04L 51/02* (2013.01)

(58) Field of Classification Search
CPC .. G06F 16/243; G06F 16/2438; G06F 40/279; G06F 40/35; G10L 15/183
See application file for complete search history.

(56) References Cited

U.S. PATENT DOCUMENTS

| | | | | |
|---|---|---|---|---|
| 10,997,968 | B2 * | 5/2021 | Wanas | G06F 40/30 |
| 11,983,488 | B1 | 5/2024 | Puri et al. | |

(Continued)

FOREIGN PATENT DOCUMENTS

| | | | |
|---|---|---|---|
| CA | 2635954 | A1 | 7/2007 |
| CN | 117350501 | A | 1/2024 |

(Continued)

OTHER PUBLICATIONS

U.S. Appl. No. 18/759,536, filed Jun. 28, 2024, Tao Ma, Hugh Nicholas Perkins, Mitchell Steven Morgan, Michael Griffiths, Satchuthananthavale Rasiah Kuhan Branavan, Kilian Quirin Weinberger.

(Continued)

*Primary Examiner* — Daniel Abebe

(74) *Attorney, Agent, or Firm* — GTC Law Group PC & Affiliates

(57) ABSTRACT

Natural language communications may be automated using language models and session contexts. A first session context may be created for communications between a language model and a first entity. Prompts may be generated using this session context, and responses from the language model may be used to communicate with the first entity. A second session context may also be created for communications between a language model and a second entity. Context transfer information may be generated by processing the first session context with a language model. The context transfer information may be added to the second session context. The second session context with the context transfer information
(Continued)

may then be used to generate a communication to the second entity using a language model.

20 Claims, 14 Drawing Sheets

Related U.S. Application Data filed on Feb. 12, 2024, provisional application No. 63/620,500, filed on Jan. 12, 2024.

(51) Int. Cl.

| | |
|---|---|
| ***G06F 40/40*** | (2020.01) |
| ***H04L 51/02*** | (2022.01) |

(56) References Cited

U.S. PATENT DOCUMENTS

| | | | | |
|---|---|---|---|---|
| 12,406,662 | B2 * | 9/2025 | Perkins | G10L 15/183 |
| 2015/0142704 | A1 | 5/2015 | London | |
| 2020/0106881 | A1 | 4/2020 | Beaver | |
| 2023/0199116 | A1 | 6/2023 | Koneru et al. | |
| 2023/0274094 | A1 | 8/2023 | Tunstall-Pedoe et al. | |
| 2023/0410801 | A1 | 12/2023 | Mishra | |
| 2024/0256762 | A1 | 8/2024 | Beauchamp | |
| 2024/0282298 | A1 | 8/2024 | Koneru et al. | |
| 2024/0290327 | A1 | 8/2024 | Byrne et al. | |
| 2024/0296177 | A1 | 9/2024 | Gardner et al. | |
| 2024/0305588 | A1 | 9/2024 | Chu et al. | |
| 2024/0362422 | A1 | 10/2024 | Callegari et al. | |
| 2024/0370142 | A1 | 11/2024 | Gray et al. | |
| 2024/0394479 | A1 * | 11/2024 | Pathak | G06F 40/295 |
| 2025/0069086 | A1 | 2/2025 | Sotiriou et al. | |
| 2025/0078822 | A1 * | 3/2025 | Perkins | G10L 15/183 |
| 2025/0104087 | A1 | 3/2025 | Subramanian et al. | |
| 2025/0138909 | A1 * | 5/2025 | Mahajan | G06F 9/541 |
| 2025/0139136 | A1 | 5/2025 | Pathak et al. | |
| 2025/0181623 | A1 | 6/2025 | Jain et al. | |
| 2025/0231972 | A1 | 7/2025 | Ma et al. | |
| 2025/0232125 | A1 | 7/2025 | Ma et al. | |
| 2025/0240351 | A1 | 7/2025 | Ostrand et al. | |

FOREIGN PATENT DOCUMENTS

| | | |
|---|---|---|
| EP | 4586133 A1 | 7/2025 |
| EP | 4586134 A1 | 7/2025 |
| EP | 4586241 A1 | 7/2025 |

OTHER PUBLICATIONS

U.S. Appl. No. 18/759,571, filed Jun. 28, 2024, Tao Ma, Hugh Nicholas Perkins, Mitchell Steven Morgan, Michael Griffiths, Satchuthananthavale Rasiah Kuhan Branavan, Kilian Quirin Weinberger.

Khot, Tushar , et al., "Decomposed Prompting: A Modular Approach for Solving Complex Tasks", Published as a conference paper at ICLR 2023, https://openreview.net/pdf?id =_nGgzQjzaRy (accessed on Sep. 26, 2024), 2023, 69 pages.

Liu, Jia , et al., "SMoT: Think in State Machine", arXiv:2312.17445v1 [cs.AI], https://arxiv.org/pdf/2312.17445v1 (accessed on Sep. 26, 2024), Dec. 29, 2023, 10 pages.

"European Application Serial No. 24223883.0, Extended European Search Report mailed Jun. 11, 2025", ASAPP, Inc, 8 pages.

"European Application Serial No. 24223885.5, Extended European Search Report mailed Jun. 12, 2025", ASAPP, Inc, 8 pages.

"European Application Serial No. 24223887.1, Extended European Search Report mailed Jun. 11, 2025", ASAPP, Inc, 9 pages.

Brade, et al., "Promptify: Text-to-image generation through interactive prompt exploration with large language models", Proceedings of the 36th Annual ACM Symposium on User Interface Software and Technology, Apr. 18, 2023, 14 pages.

* cited by examiner

MANAGING MULTI-SESSION CONTEXTS AND COMMUNICATIONS USING LANGUAGE MODELS

CLAIM OF PRIORITY

This patent application claims the benefit of the following provisional applications:

U.S. Patent Application Ser. No. 63/620,500, filed Jan. 12, 2024, and entitled "VOICE CONCURRENCY";

U.S. Patent Application Ser. No. 63/552,285, filed Feb. 12, 2024, and entitled "AI ORCHESTRATION FRAMEWORK"; and U.S. Patent Application Ser. No. 63/632,635, filed Apr. 11, 2024, and entitled "INTERACTIVE COMMUNICATION SYSTEM UTILIZING LANGUAGE MODELS".

The content of each of the foregoing applications is hereby incorporated by reference in its entirety for all purposes.

BACKGROUND

Companies may provide support to end users by allowing users to receive support from human support agents. However, human support agents may be a large cost that companies would like to reduce. The use of automated support agents may reduce costs, but where automated support agents fail to provide adequate support, the user may need to be transmitted to a human agent. The transfer to human agents to directly interact with end users may increase costs for the company and provides a bad experience for users. Improved automated support agents are needed to reduce support costs and provide a better experience for users.

SUMMARY

In some aspects, the techniques described herein relate to a computer-implemented method, including: receiving a first user communication from a first user; generating a first language model prompt, wherein the first language model prompt: includes a representation of the first user communication, describes a plurality of language model response types, the plurality of language model response types including (a) transmitting a communication to a user, (b) performing an API call, and (c) requesting assistance from a human agent, and instructs a language model to return a language model response; receiving a first language model response from the language model as a result of submitting the first language model prompt to the language model, wherein the first language model response indicates a type of performing an API call and includes a representation of a first API call; receiving a first API response as a result of performing the first API call; generating a second language model prompt, wherein the second language model prompt: includes the representation of the first user communication and a representation of the first API response, describes the plurality of language model response types, and instructs the language model to return a language model response; receiving a second language model response from the language model as a result of submitting the second language model prompt to the language model, wherein the second language model response indicates a type of requesting assistance from a human agent and includes a representation of a first human agent request; causing the first human agent request to be presented to a first human agent; receiving a first human agent communication from the first human agent; generating a third language model prompt, wherein the third language model prompt: includes the representation of the first user communication, the representation of the first API response, and a representation of the first human agent communication, describes the plurality of language model response types, and instructs the language model to return a language model response; receiving a third language model response from the language model as a result of submitting the third language model prompt to the language model, wherein the third language model response indicates a type of transmitting a communication to a user and includes a representation of a first automated communication; and causing the first automated communication to be presented to the first user.

In some aspects, the techniques described herein relate to a computer-implemented method, wherein the third language model prompt includes the representation of the first API call and the representation of the first human agent request.

In some aspects, the techniques described herein relate to a computer-implemented method, wherein the first language model prompt describes a plurality of API calls.

In some aspects, the techniques described herein relate to a computer-implemented method, including: maintaining a first context for using the language model to communicate with the first user, wherein the first context includes the representation of the first user communication; and maintaining a second context for using the language model to communicate with the first human agent, wherein the second context includes the first human agent communication.

In some aspects, the techniques described herein relate to a computer-implemented method, including maintaining a third context for using the language model to communicate with an API gateway.

In some aspects, the techniques described herein relate to a computer-implemented method, including copying a portion of the second context to the first context.

In some aspects, the techniques described herein relate to a computer-implemented method, wherein the first user communication is a text communication.

In some aspects, the techniques described herein relate to a system, including at least one server computer including at least one processor and at least one memory, the at least one server computer configured to: receive a first user communication from a first user; generate a first language model prompt, wherein the first language model prompt: includes a representation of the first user communication, describes a plurality of language model response types, the plurality of language model response types including (a) transmitting a communication to a user, (b) performing an API call, and (c) requesting assistance from a human agent, and instructs a language model to return a language model response; receive a first language model response from the language model as a result of submitting the first language model prompt to the language model, wherein the first language model response indicates a type of performing an API call and includes a representation of a first API call; receive a first API response as a result of performing the first API call; generate a second language model prompt, wherein the second language model prompt: includes the representation of the first user communication and a representation of the first API response, describes the plurality of language model response types, and instructs the language model to return a language model response; receive a second language model response from the language model as a result of submitting the second language model prompt to the language model, wherein the second language model response indicates a type of requesting assistance from a human agent and includes a representation of a first human agent request; cause the first human agent request to be presented to a first human agent; receive a first human agent communication from the first human agent; generate a third language model prompt, wherein the third language model prompt: includes the representation of the first user communication, the representation of the first API response, and a representation of the first human agent communication, describes the plurality of language model response types, and instructs the language model to return a language model response; receive a third language model response from the language model as a result of submitting the third language model prompt to the language model, wherein the third language model response indicates a type of transmitting a communication to a user and includes a representation of a first automated communication; and cause the first automated communication to be presented to the first user.

In some aspects, the techniques described herein relate to a system, wherein the at least one server computer is configured to: maintain a first context for using the language model to communicate with the first user, wherein the first context includes the representation of the first user communication; and maintain a second context for using the language model to communicate with the first human agent, wherein the second context includes the first human agent communication.

In some aspects, the techniques described herein relate to a system, wherein the at least one server computer is configured to copy a portion of the second context to the first context.

In some aspects, the techniques described herein relate to a system, wherein the first user communication is an audio communication and the representation of the first user communication corresponds to a transcription of the first user communication.

In some aspects, the techniques described herein relate to a system, wherein the at least one server computer is configured to: receive a second human agent communication from the first human agent, wherein the second human agent communication is not in response to a human agent request; and generate a fourth language model prompt, wherein the fourth language model prompt includes a representation of the second human agent communication.

In some aspects, the techniques described herein relate to a system, wherein the at least one server computer is configured to: determine a task category of the first user communication; and generate the first language model prompt using the task category of the first user communication.

In some aspects, the techniques described herein relate to a system, wherein the at least one server computer is configured to determine the task category of the first user communication by processing the first user communication with an intent classifier.

In some aspects, the techniques described herein relate to a system, wherein the at least one server computer is configured to determine the task category of the first user communication by generating a language model prompt and receiving a language model response from the language model or another language model.

In some aspects, the techniques described herein relate to one or more non-transitory, computer-readable media including computer-executable instructions that, when executed, cause at least one processor to perform actions including: receiving a first user communication from a first user; generating a first language model prompt, wherein the first language model prompt: includes a representation of the first user communication, describes a plurality of language model response types, the plurality of language model response types including (a) transmitting a communication to a user, (b) performing an API call, and (c) requesting assistance from a human agent, and instructs a language model to return a language model response; receiving a first language model response from the language model as a result of submitting the first language model prompt to the language model, wherein the first language model response indicates a type of performing an API call and includes a representation of a first API call; receiving a first API response as a result of performing the first API call; generating a second language model prompt, wherein the second language model prompt: includes the representation of the first user communication and a representation of the first API response, describes the plurality of language model response types, and instructs the language model to return a language model response; receiving a second language model response from the language model as a result of submitting the second language model prompt to the language model, wherein the second language model response indicates a type of requesting assistance from a human agent and includes a representation of a first human agent request; causing the first human agent request to be presented to a first human agent; receiving a first human agent communication from the first human agent; generating a third language model prompt, wherein the third language model prompt: includes the representation of the first user communication, the representation of the first API response, and a representation of the first human agent communication, describes the plurality of language model response types, and instructs the language model to return a language model response; receiving a third language model response from the language model as a result of submitting the third language model prompt to the language model, wherein the third language model response indicates a type of transmitting a communication to a user and includes a representation of a first automated communication; and causing the first automated communication to be presented to the first user.

In some aspects, the techniques described herein relate to one or more non-transitory, computer-readable media, wherein the actions include: maintaining a first context for using the language model to communicate with the first user, wherein the first context includes the representation of the first user communication; and maintaining a second context for using the language model to communicate with the first human agent, wherein the second context includes the first human agent communication.

In some aspects, the techniques described herein relate to one or more non-transitory, computer-readable media, wherein the actions include performing a safety check on the first user communication.

In some aspects, the techniques described herein relate to one or more non-transitory, computer-readable media, wherein the plurality of language model response types includes transferring the first user to a human agent, requesting information from a knowledge base, or indicating that a task is completed.

In some aspects, the techniques described herein relate to one or more non-transitory, computer-readable media, wherein the first language model prompt instructs the language model to provide a plan for a next step.

In some aspects, the techniques described herein relate to a system, including: a communication processing circuit configured to receive a first natural language communication from a user and update a session context; a prompt generator circuit configured to generate a prompt that includes: a representation of the first natural language communication, and a description of a plurality of language model response types, wherein the description includes a first response type that describes transmitting a reply to a user and a second response type that describes requesting assistance from a human agent; a language model configured to receive the prompt and generate a response, wherein the response includes: a reply to the first natural language communication of the user, or a request for assistance from the human agent; a response routing circuit configured to: detect that the response is a reply to the user and route the response to the user, or detect that the response is a request for assistance from the human agent and route the request to the human agent; and a feedback circuit configured to: collect feedback on the session context from the human agent, and update the session context using the feedback.

In some aspects, the techniques described herein relate to a system, wherein the collected feedback includes an interjection from the human agent.

In some aspects, the techniques described herein relate to a system, wherein: the response routing circuit is further configured to route the response to a second human agent; and the feedback circuit is further configured to: collect feedback on the session context from the second human agent, and update the session context using the feedback.

In some aspects, the techniques described herein relate to a system, wherein the collected feedback from the second human agent includes an interjection from the second human agent.

In some aspects, the techniques described herein relate to a system, wherein: the communication processing circuit is further configured to route the session context to a second human agent; and the feedback circuit is further configured to collect feedback on the session context from the second human agent and update the session context.

In some aspects, the techniques described herein relate to a system, wherein the collected feedback from the second human agent includes an interjection from the second human agent.

In some aspects, the techniques described herein relate to a system wherein the collected feedback includes natural language text from the human agent.

In some aspects, the techniques described herein relate to a system, wherein the description of the plurality of language model response types further includes a third response type that describes performing an API call.

In some aspects, the techniques described herein relate to a system, wherein the response includes a request to perform an API call.

In some aspects, the techniques described herein relate to a system, wherein the feedback circuit is configured to generate a summary of the session context for the human agent.

In some aspects, the techniques described herein relate to a system, including: a communication processing circuit configured to receive a first natural language communication from a user, generate a session context, and present at least a portion of the session context to a first human agent; a feedback circuit configured to collect feedback from the first human agent, and update the session context; a prompt generator circuit configured to generate a prompt that includes: a representation of the updated session context, and a description of a plurality of language model response types, wherein the description includes a first response type that describes transmitting a reply to a user and a second response type that describes requesting assistance from a human agent; and a language model configured to receive the prompt and generate a response.

In some aspects, the techniques described herein relate to a system, wherein the collected feedback includes an interjection from the first human agent.

In some aspects, the techniques described herein relate to a system, wherein the response includes: a reply to the first natural language communication of the user, or a request for assistance from a second human agent.

In some aspects, the techniques described herein relate to a system, further including: a response routing circuit configured to: detect that the response is a reply to the user and route the response to the user, or detect that the response is a request for assistance from the human agent and route the request to a second human agent.

In some aspects, the techniques described herein relate to a system, wherein the feedback circuit is further configured to: collect feedback on the session context from the second human agent, and update the session context using the feedback.

In some aspects, the techniques described herein relate to a system, wherein the collected feedback from the second human agent includes an interjection from the second human agent.

In some aspects, the techniques described herein relate to a system, wherein the feedback circuit is configured to generate a summary of the session context for the first human agent.

In some aspects, the techniques described herein relate to a system, wherein the collected feedback includes natural language text from the first human agent.

In some aspects, the techniques described herein relate to a system, wherein the second human agent is the first human agent.

In some aspects, the techniques described herein relate to a system, wherein: the description of a plurality of language model further includes a third response type that describes performing an API call; and the response includes a request to perform an API call.

In some aspects, the techniques described herein relate to a computer-implemented method, including: creating a first session context for communications between a first language model and a first entity; updating the first session context to include a representation of a first communication between the first language model and the first entity; generating a first language model prompt using the first session context; receiving a first language model response from the first language model using the first language model prompt; causing a second communication to be transmitted to the first entity using the first language model response; updating the first session context to include a representation of the second communication; generating context transfer information by processing the first session context with a second language model; creating a second session context for communications between a third language model and a second entity; updating the second session context to include a representation of the context transfer information; generating a second language model prompt using the second session context; receiving a second language model response from the third language model using the second language model prompt; and causing a third communication to be transmitted to the second entity using the second language model response.

In some aspects, the techniques described herein relate to a computer-implemented method, wherein generating the context transfer information includes instructing the first language model to summarize the first session context.

In some aspects, the techniques described herein relate to a computer-implemented method, wherein generating the context transfer information includes instructing the first language model to exclude extraneous or sensitive information from the first session context.

In some aspects, the techniques described herein relate to a computer-implemented method, wherein: the second language model is a different language model than the first language model; the third language model is a different language model than the first language model; and the third language model is a different language model than the second language model.

In some aspects, the techniques described herein relate to a computer-implemented method, wherein: the second language model is the first language model; and the third language model is the first language model.

In some aspects, the techniques described herein relate to a computer-implemented method, including: generating second context transfer information by processing the second session context with a fourth language model; and updating the first session context to include a representation of the second context transfer information.

In some aspects, the techniques described herein relate to a computer-implemented method, including: creating a third session context for communications between a fourth language model and a third entity; generating second context transfer information by processing the first session context with the second language model; and updating the third session context to include a representation of the second context transfer information.

In some aspects, the techniques described herein relate to a computer-implemented method, wherein generating the context transfer information includes instructing the first language model to exclude extraneous or sensitive information from the first session context.

In some aspects, the techniques described herein relate to a system, including at least one server computer including at least one processor and at least one memory, the at least one server computer configured to: create a first session context for communications between a first language model and a first entity; update the first session context to include a representation of a first communication between the first language model and the first entity; generate a first language model prompt using the first session context; receive a first language model response from the first language model using the first language model prompt; cause a second communication to be transmitted to the first entity using the first language model response; update the first session context to include a representation of the second communication; generate context transfer information by processing the first session context with a second language model; create a second session context for communications between a third language model and a second entity; update the second session context to include a representation of the context transfer information; generate a second language model prompt using the second session context; receive a second language model response from the third language model using the second language model prompt; and cause a third communication to be transmitted to the second entity using the second language model response.

In some aspects, the techniques described herein relate to a system, wherein the at least one server computer is configured to generate the context transfer information by instructing the first language model to summarize the first session context.

In some aspects, the techniques described herein relate to a system, wherein the at least one server computer is configured to generate the context transfer information by instructing the first language model to exclude extraneous or sensitive information from the first session context.

In some aspects, the techniques described herein relate to a system, wherein the first language model has a longer context window than the second language model.

In some aspects, the techniques described herein relate to a system, wherein the first language model prompt describes a plurality of language model response types and instructs the first language model to return a language model response.

In some aspects, the techniques described herein relate to a system, wherein the first language model prompt describes a plurality of API calls.

In some aspects, the techniques described herein relate to a system, wherein the at least one server computer is configured to: generate second context transfer information by processing the second session context with a fourth language model; and update the first session context to include a representation of the second context transfer information.

In some aspects, the techniques described herein relate to one or more non-transitory, computer-readable media including computer-executable instructions that, when executed, cause at least one processor to perform actions including: creating a first session context for communications between a first language model and a first entity; updating the first session context to include a representation of a first communication between the first language model and the first entity; generating a first language model prompt using the first session context; receiving a first language model response from the first language model using the first language model prompt; causing a second communication to be transmitted to the first entity using the first language model response; updating the first session context to include a representation of the second communication; generating context transfer information by processing the first session context with a second language model; creating a second session context for communications between a third language model and a second entity; updating the second session context to include a representation of the context transfer information; generating a second language model prompt using the second session context; receiving a second language model response from the third language model using the second language model prompt; and causing a third communication to be transmitted to the second entity using the second language model response.

In some aspects, the techniques described herein relate to one or more non-transitory, computer-readable media, wherein the first entity is a user obtaining support from a company.

In some aspects, the techniques described herein relate to one or more non-transitory, computer-readable media, wherein the second entity is a human agent.

In some aspects, the techniques described herein relate to one or more non-transitory, computer-readable media, wherein the second entity is an API endpoint.

In some aspects, the techniques described herein relate to one or more non-transitory, computer-readable media, wherein the actions include: generating second context transfer information by processing the second session context with a fourth language model; and updating the first session context to include a representation of the second context transfer information.

BRIEF DESCRIPTION OF THE FIGURES

The invention and the following detailed description of certain embodiments thereof may be understood by reference to the following figures.

DETAILED DESCRIPTION

Companies may need to provide support to their customers or end users. For many companies, providing support may be a large expense and it may be desired to provide support to users at lower cost. Automated techniques, such as automated speech recognition, speech synthesis, and language models, may be used to automate support and reduce costs. Automated techniques, however, may fail to provide adequate support, and in such instances, the user may be transferred to receiving support from a human agent. To further reduce the costs of providing support, human agents may assist the automated support so that the automated support provides better assistance. This allows quality support to end users at lower cost.

Figure 1A:
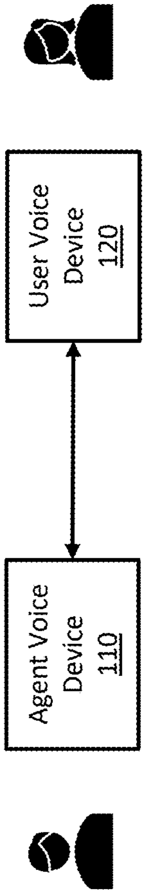
FIGS. 1A-C are example systems for providing support to users.

FIG. 1A is an example system for a human agent to provide voice support to a user. The human agent uses agent voice device 110 (e.g., a computer) to speak with user on user voice device 120 (e.g., a phone). A human agent may provide high quality voice support, but since a human agent can only speak to one user at a time, the costs are high.

Figure 1B:
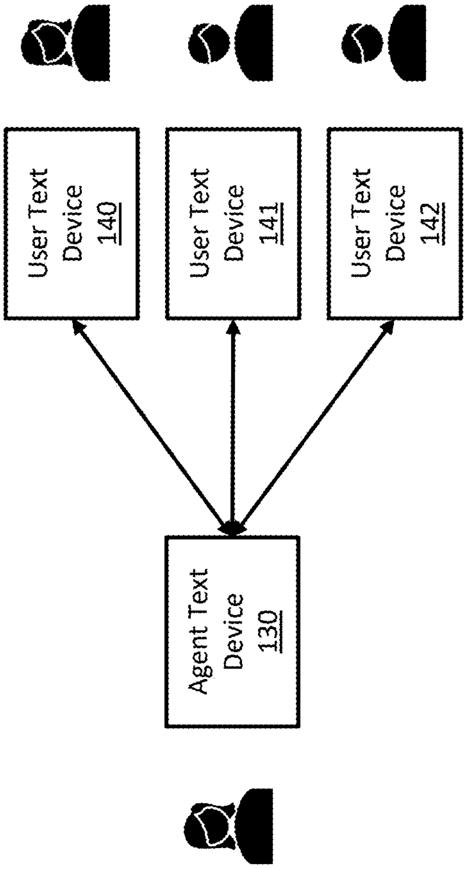

FIG. 1B is an example system for a human agent to provide text support to multiple users at the same time. The human agent uses agent text device 130 (e.g., a computer) to communicate with several users on user text device 140 (e.g., a phone), user text device 141, and user text device 142. A human agent may provide high quality text support, but since a human agent can only maintain text communications with a few users at a time, the costs are still high.

Figure 1C:
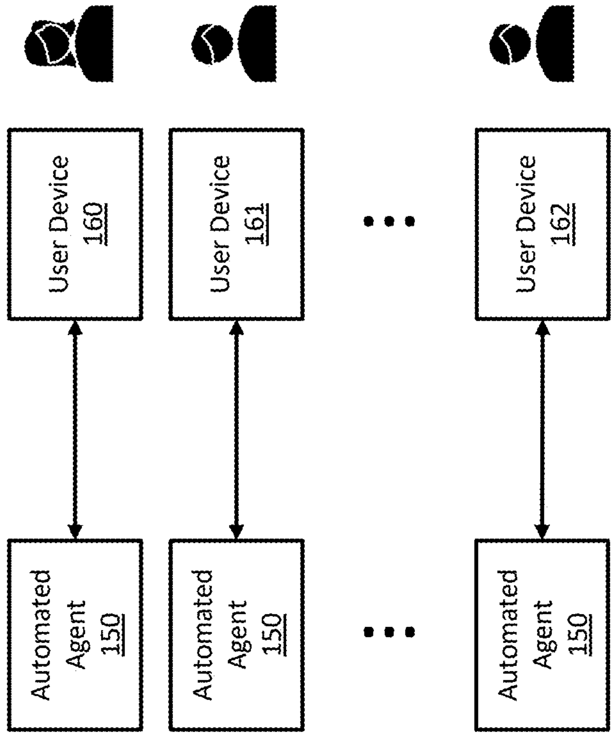

FIG. 1C is an example system for providing fully automated support to users. The support may be via text or voice. Multiple instances of automated agent 150 may provide support to any number of users, such as users on user device 160, user device 161, and user device 162. The costs of providing fully automated support are low, but when automated support is not adequate, a user needs to be transferred to more costly support from a human.

Figure 2:
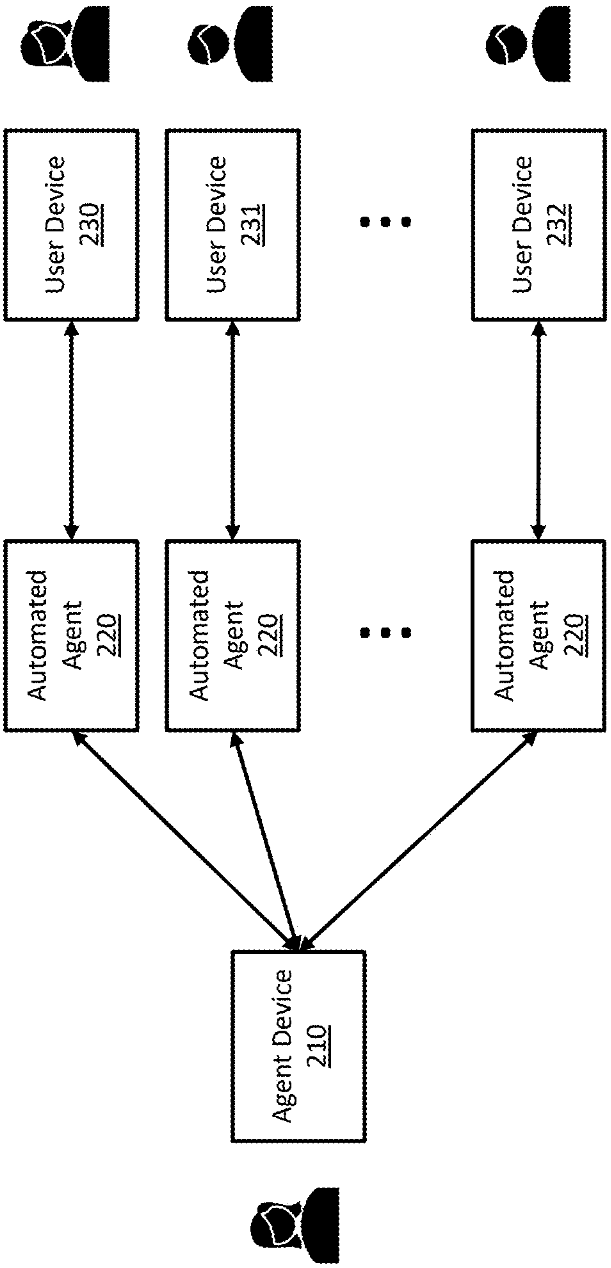
FIG. 2 is an example system for providing automated support to users where a human agent may assist an automated agent to improve the quality of the automated support.

FIG. 2 is an example system for providing automated support to users where a human agent may assist an automated agent to improve the quality of the automated support. Communications between the automated agent and user may be via text or voice. Communications between the human agent and the automated agent may also be via text or voice. Multiple instances of automated agent 220 may provide support to any number of users, such as users on user device 230, user device 231, and user device 232. Where the support to end users is or may be inadequate, a human agent on agent device 210 may assist the automated agent to improve the quality of the support as described herein. In some implementations, the human agent never communicates directly with the users and communicates only with the automated agent. For example, the automated support may request assistance by providing a question to the human agent, and the response of the human agent may be used by the automated agent to provide assistance to the user. For another example, the human agent may monitor multiple support sessions and interject information to cause the automated agent to provide better support. The interjection may be formulated using any appropriate language, such as a command or a suggestion. The interjection may be referred to as a whisper by the human agent.

An automated agent that may communicate with both a user and a human agent may be implemented with a language model, such as a large language model. Large language models (LLMs), such as the GPT models created by OpenAI™, have recently provided impressive results for a variety of tasks. A user may submit a text question to an LLM to receive a response or may provide text instructions to an LLM to perform a task. The response of the LLM may appear similar to a response generated by a person or may even perform better than many people on certain tasks. An LLM may be any language model that has a larger number of parameters. The techniques described herein may be performed with any appropriate language model, and a large language model is not required.

A language model is a mathematical model that stores information about natural language, such as patterns, structures, and relationships of natural language. A language model may, for example, be able to determine probabilities, likelihoods, or scores corresponding to sequences of words or sentences or may be able to generate text. For example, a language model may be used for one or more of the following applications: text completion, text generation, language translation, sentiment analysis, or text summarization. A language model may use any appropriate mathematical model, such as a neural network. In some implementations, a language model may use a transformer model architecture, such as one or more transformer blocks. In some implementations, a language model may include sequences of layers, such as one or more of the following layers: an embedding layer, an attention layer, a multi-head attention layer, a feed-forward layer, a normalization layer, a linear layer, or a softmax layer.

Language models may automate many text-processing tasks that are tedious or difficult for a person. Language models may also perform tasks relating to processing text that is different from everyday language, such as computer software, the text of web pages (e.g., web pages written using HTML or hypertext markup language), or descriptions of API calls.

Figure 3:
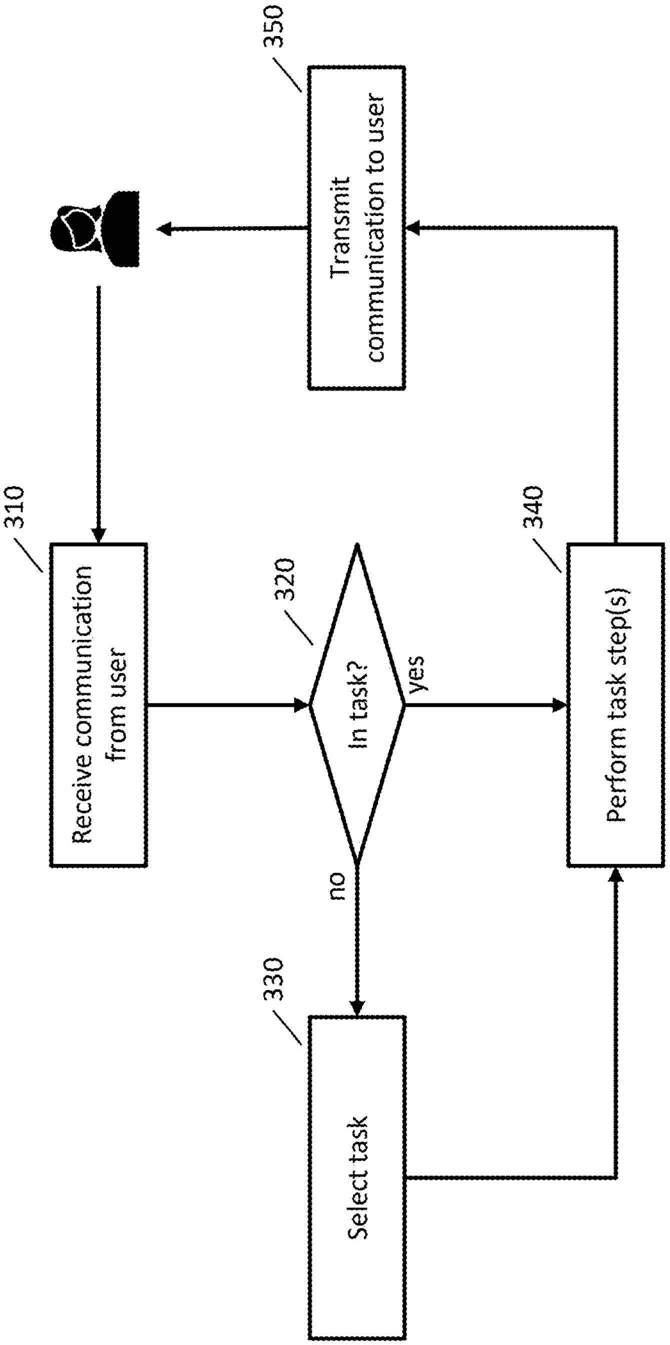
FIG. 3 is a flowchart of an example method for selecting a task for an automated support process using a language model.

FIG. 3 is a flowchart of an example method for selecting a task for an automated support process using a language model.

At step 310, a communication is received from a user. The communication may be received by a company or by third-party providing a service on behalf of the company. The communication may be received from any appropriate person, such as a customer of the company or a prospective customer of the company. The communication may include any form of natural language, such as speech audio or text. Where the communication is received as audio, automated speech recognition may be performed convert the audio to text (or to any other types of tokens that may be processed by a language model). The communication may be transmitted using any appropriate device, such as a mobile device, wearable device, smart phone or computer. The communication may be transmitted over any appropriate network, such as any combination of the Internet and mobile networks.

In some implementations, a safety check may be performed on the communications. A malicious user may attempt to construct a communication with the purpose of causing a language model to return sensitive or proprietary information, such as information about prompts used by the language model. Any appropriate techniques may be used to implement a safety check. In some implementations, a safety check may be performed using a classifier or by constructing a prompt to ask a language model if the communication is not safe.

At step 320, it is determined if this user is already being assisted on a task. This may be determined using any appropriate techniques, such as retrieving an indicator from a database. The task may be any appropriate task, such as any of the tasks described herein.

Where the user is not yet being assisted on a task, then processing proceeds to step 330, where a task category is selected corresponding to the communication of the user. Any appropriate techniques may be used to determine a task category, such as processing the communication with an intent classifier or constructing a prompt to ask a language model to determine a task category corresponding to the communication. The task category may be selected from a preexisting list of possible task categories. In some implementations, task categories may be associated with a language model prompt for completing the task, such as any of the language model prompts descried herein.

Where the user is already in a task at step 320 or after a task has been selected at step 330, then processing proceeds to step 340 where one or more actions of the task may be performed. The tasks actions may be implemented using any appropriate techniques, such as any of the techniques described herein. In some implementations, a language model prompt may be used to determine an action to be performed. Any appropriate actions may be performed such as performing an API call to obtain data or information relevant to the task, requesting assistance from a human agent, or transmitting a communication to the user. Where the actions do not require communicating to the user, the actions may be sequentially performed at step 340.

Where an action is to transmit a communication to the user, then processing proceeds to step 350 where a communication is transmitted to the user. The communication may be transmitted to the user using any of the techniques described above for receiving a communication from the user. In some implementations, a safety check may be performed on the communication to check if the communication contains sensitive or proprietary information (e.g., using a classifier or a language model). Where communication with the user is via voice, a text communication may be converted to audio using speech synthesis.

After the communication has been transmitted to the user, the user may review the communication and transmit another communication. This communication may be processed as described above. This process may be repeated until the task is completed.

Figure 4:
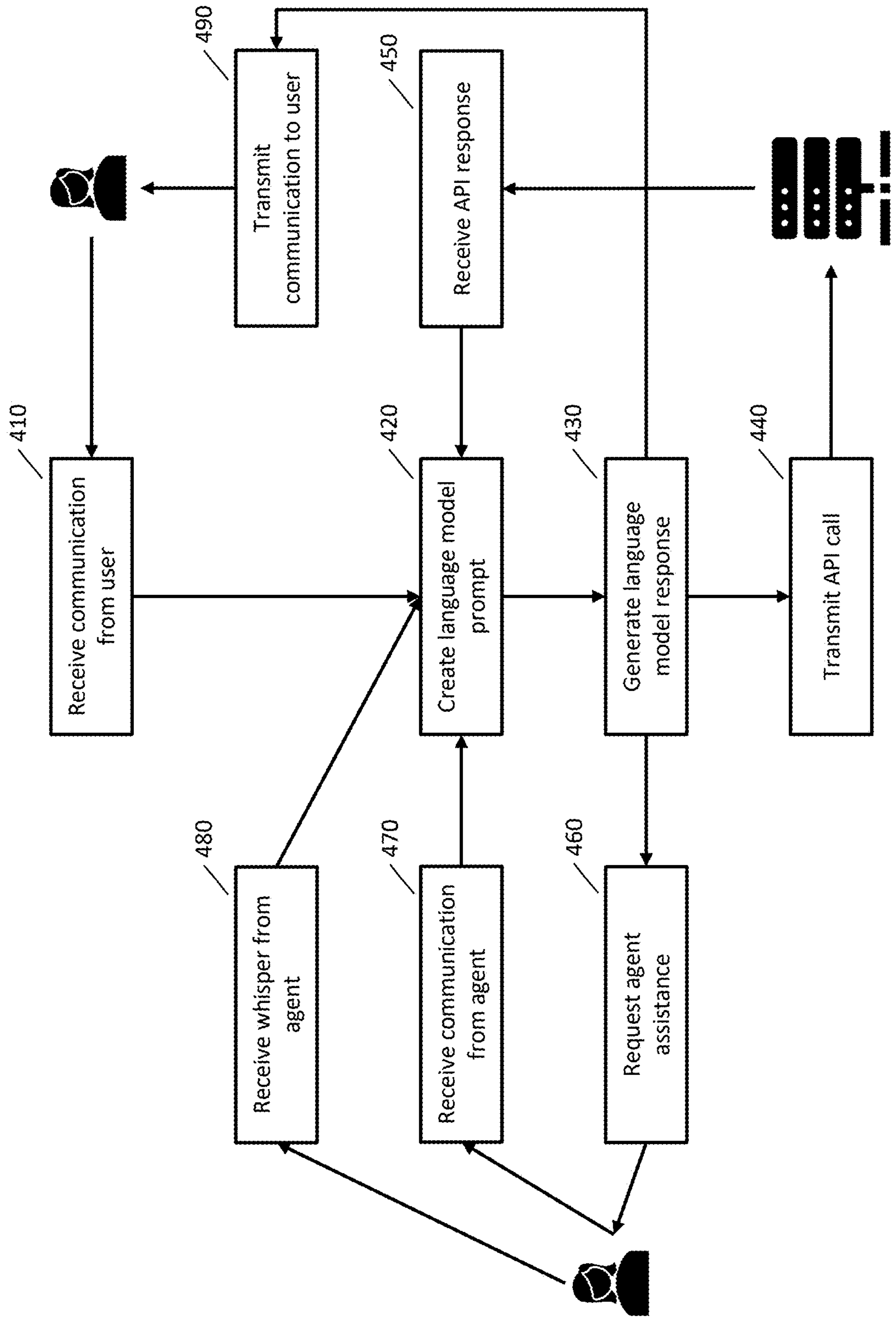
FIG. 4 is a flowchart of an example method for implementing an automated support process using a language model.

FIG. 4 is a flowchart of an example method for implementing an automated support process using a language model. For clarity of presentation, task selection is not shown in FIG. 4, and where needed, task selection may be performed as described in FIG. 3.

At step 410, a communication is received from a user. This step may be performed using any appropriate techniques, such as those described at step 310 of FIG. 3.

At step 420, a language model prompt is generated to perform an action to assist the user with a task. Any appropriate techniques may be used to generate a language model prompt. In some implementations, a language model prompt template may be received. For example, a language model prompt template may selected corresponding to the task being performed for the user.

A language model prompt may include any appropriate text. The prompt may inform the language model to perform as a customer support agent and may describe an appropriate communication style. The prompt may instruct the language model to return a response according to a list of indicated response types. Any appropriate response types may be used. For example, the response types may include one or more of the following: speak a communication to a user (SPEAK), perform an API call (APICALL), request information from a knowledge base (KNOWLEDGEBASE), request assistance from a human agent (ASKAGENT), switch to a different task (CHANGETASK), transfer the customer to a human agent (TRANSFER), or end the communications session (END).

Where a language model prompt includes a response type to perform an API call, the prompt may also describe a list of available API calls. For example, an API call may include one or more of the following: a name, a description of the operations performed, arguments to be provided in the API call, the data types of arguments provided in the API call, values to be returned by the API call, or data types of values to be returned by the API call.

In some implementations, the language model prompt may instruct the language model to provide a text description of a plan for the next step or sequence of steps to be performed to progress in completing the task. For example, the plan may indicate a reason or rationale for subsequent steps. The prompt may also instruct the language model to start the plan with a specified keyword (e.g., THOUGHTS) to help distinguish the plan from other portions of the response. Asking the language model to provide a plan may improve the performance of the language model. The plan may also be used to improve subsequent actions, such as including the plan in a subsequent prompt.

In some implementations, the formulation of a plan by the language model may be a separate action from other actions to be performed. For example, a language model prompt may instruct the language model to formulate a plan or update an existing plan for accomplishing a task without asking the language model to also select another action to be performed. In some implementations, the formulation of a plan by the language model may be performed while the language model is also specifying another action (e.g., APICALL). In some implementations, the formulation of a plan may be an additional response type that is described in the prompt and available to the language model.

The language model prompt may also include a representation of a history of the communication session, which may be referred to as the user session context or user context. The user context may include representations of any of the following: communications received from the user, communications transmitted to the user, plans determined by the language model, API calls performed, API call responses received, or communications received from a human agent.

At step 430, a language model response is generated by submitting the language model prompt to a language model (such as a large language model). The language model response may be obtained using any appropriate techniques. In some implementations, the language model may be implemented locally, and the response may be obtained using a function call or using a local API. In some implementations, the language model may be implemented by a third party, and the prompt may be transmitted to the third party.

The language model response may have a response type as indicated by the prompt. Subsequent processing may be performed according to the response type of the language model response. In the example of FIG. 4, three different response types are possible: APICALL, ASKAGENT, and SPEAK.

Where the response type is APICALL, then processing proceeds to step 440 where the API call is transmitted. In some implementations, the API call to be performed may be taken verbatim from the language model response. In some implementations, the API call to be performed may be determined from the language model response but additional processing may be performed (e.g., retrieving a uniform resource locator (URL), argument names, or argument values).

After transmitting the API call, processing proceeds to step 450 where an API response is received. In some implementations, the API response may be postprocessed to obtain information that is more suitable to be used with a language model (e.g., removing extraneous information or formatting changes).

The transmitting of the API call and the receiving of the API response may be performed using any appropriate techniques. In some implementations, as described in greater detail below, an API language model may be used to construct the API call or to postprocess the API response. The API language model may be the same language model used at step 430 or may be a different language model. An API session context or API context may be created from a history of communications with the API language model, and the API context may be used in a similar manner as the user context.

After step 450, processing proceeds to step 420 where another language model prompt is generated. In some implementations, the user context may be updated to include one or both of a representation of the API call or a representation of the API response. The creation of the language model prompt may proceed as above, and the prompt may now include information relating to the API call and/or the API response. Processing then proceeds to step 430, where another language model response is obtained using the language model prompt.

Where the response type is ASKAGENT, then processing proceeds to step 460 where assistance is requested from a human agent. In some implementations, an ASKAGENT response may include text of a question to be asked to a human agent. At step 460, a human agent may be selected to request assistance from. In some implementations, a human agent is assigned to a particular user session, and that agent will be used for all instances where human agent assistance is requested. In some implementations, a human agent may be selected each time that assistance is requested, such as selecting a human agent from a pool of available human agents.

After a human agent is selected information may be presented to the human agent. Information may be presented using any appropriate techniques (e.g., voice or text). In some implementations, the agent will have an agent dashboard to easily view relevant information about the user session. For example, the agent may be presented with one or more of the following: a representation of a recent portion of the user context, a representation of the complete user context, or information about the user (e.g., a user profile). The agent may then speak or type a response to the request for assistance.

At step 470, an agent communication is received from the human agent. In some implementations, the agent communication may be processed. For example, the agent communication may be summarized to make it shorter or modified to remove extraneous or sensitive information (e.g., the name of the agent).

The transmitting of the human agent request and the receiving of the human agent response may be performed using any appropriate techniques. In some implementations, as described in greater detail below, a human agent language model may be used to present information to the agent, postprocess the human agent response, or to allow the human agent to request information (e.g., by having the human agent LLM perform an API call). The human agent language model may be the same language model used at step 430 or may be a different language model. A human agent session context or human agent context may be created from a history of communications with the human agent language model, and the human agent context may be used in a similar manner as the user context After step 470, processing proceeds to step 420 where another language model prompt is generated. In some implementations, the user context may be updated to include one or both of the request for assistance from the human agent or a representation of the human agent communication. The creation of the language model prompt may proceed as above, and the prompt may now include information relating to the request for assistance and/or the human agent communication. Processing then proceeds to step 430, where another language model response is obtained using the language model prompt.

Where the response type is SPEAK, then processing proceeds to step 490 where a communication is transmitted to the user. In some implementations, a SPEAK response may include text of a communication to be presented to the user. The communication may be transmitted to the user in any of the ways that communications may be received from the user. After receiving the communication, the user may transmit another communication to continue the support process to complete the task.

In some implementations, a human agent may provide input to the automated agent without being asked to provide input. As described in greater detail below, a human agent may have access to information about the support session and/or may monitor the progress of the support session. The human agent may transmit a communication to be processed by the automated agent, and this communication may take any of the forms described herein. At step 480, a human agent transmits an unsolicited human agent communication or whisper to the automated agent. The human agent communication may be received and transmitted using any of the techniques described herein. At step 420, the unsolicited human agent communication may be added to the user context and/or be used to generate a subsequent prompt.

In some implementations or in some situations, input may be received while other input is being processed or while waiting for input (e.g., waiting for the user, an API response, or a human agent). Any appropriate techniques may be used to process the newly received input. For example, any of the following may be employed: (a) where the process is waiting for a response from a human agent, newly received input may not be processed until the response from the human agent is received (e.g., where the human agent response might override or change a next action to be performed); (b) where the process is waiting for a response from a user, newly received input may immediately be processed to provide updated information to the user (e.g., where newly received input from the human agent would impact the current task); (c) where the process is waiting for an API response or an API response was just received, the API response may be discarded or any changes implemented by the API call may be rolled back (e.g., where newly received input might deem the API call as not necessary or incorrect).

The steps of FIG. 4 may be sequentially repeated until the task is complete or until some other desired stopping criterion is reached. For example, a language model response may indicate that the task is complete, and a final communication may be sent to the user and the communications session ended. For another example, where the process is waiting for a response from a user, and a response has not been received for longer than a threshold amount of time, the processing may terminate.

Figure 5:
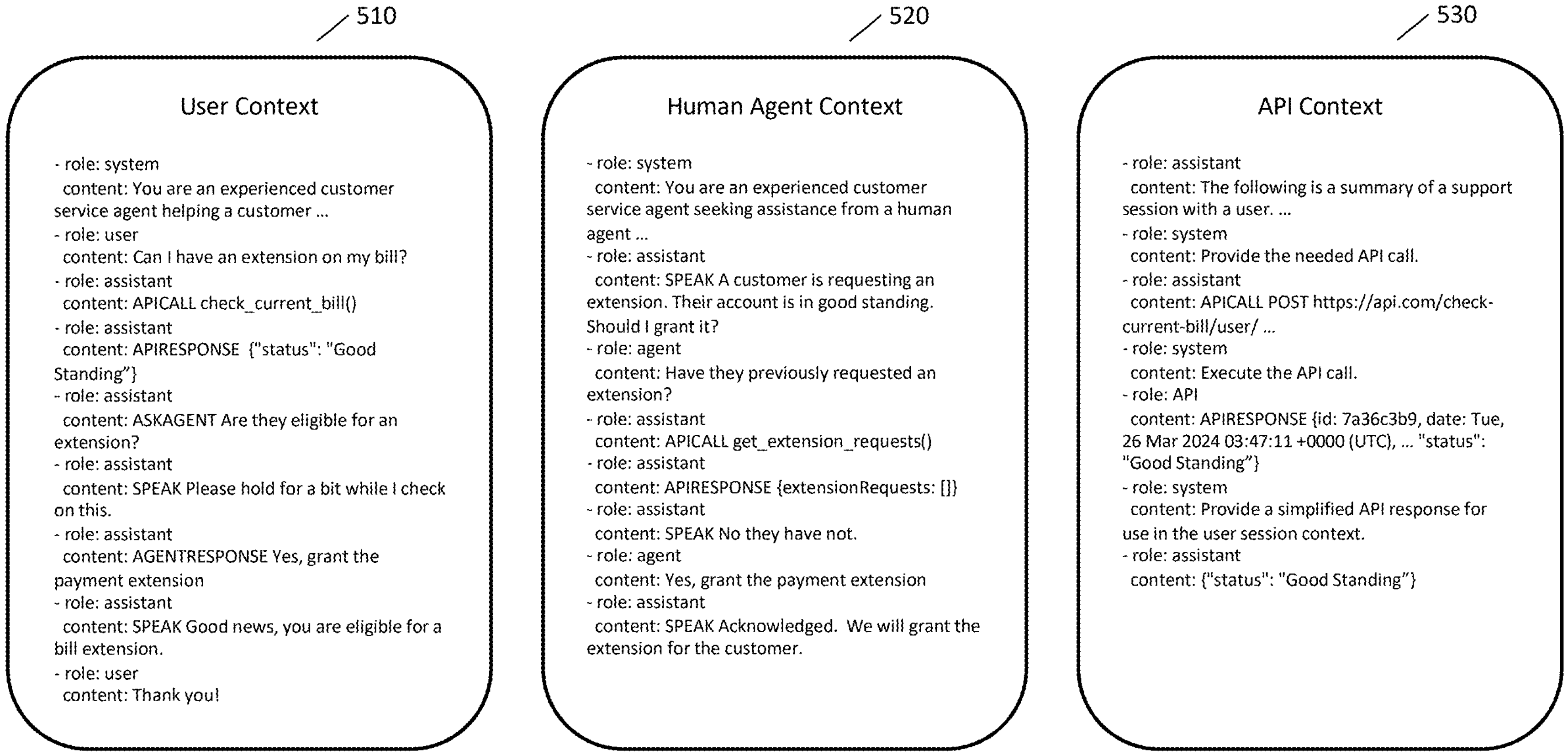
FIG. 5 is an illustration of example contexts may be used when providing support using a language model.

FIG. 5 is an illustration of example contexts may be used when providing support using a language model. As used herein, a context is any appropriate representation of interactions between a language model and an entity (e.g., a user, a human agent, or an API endpoint) that may provide communications to be processed by the language model. In some implementations, all interactions with a language model may be stored in a single context. For example, in FIG. 4, the interactions with the user, the human agent, and one or more API endpoints may all be stored in the same context.

In some implementations, it may be desired to use separate contexts for interactions with different entities. Separate contexts may be desired for a variety of reasons. In some implementations, interactions with one entity might contain sensitive information that should not be included in another context. Communications with a human agent might include confidential information of the company, and this confidential information should not be included in the user context to prevent this sensitive information from inadvertently being revealed to the user. In some implementations, a context might contain extraneous information that would not be useful or might be harmful if included in another context. An API response might include logging or tracking information that would not be useful for helping a user. In some implementations, the quality of language model responses may be impacted by a limited-size context window. Storing all communications in a single context may require a larger context window to provide high quality language model responses, and larger context windows may increase the costs of generating language model responses.

In FIG. 5, three example contexts are shown. In these examples, a role is assigned to the participants in the session, such as a role for "system" that may provide instructions to the language model), a role for "user" that may include a representation of communications received from a user, a role for "assistant" for communication transmitted by a language model of the automated support process (e.g., communications to the user, a human agent, or an API call transmitted to an API endpoint), a role of "agent" for communications received from a human agent, and a role of "API" for API responses. In some implementations, roles may not be used at all or other roles may be used.

In FIG. 5, user context 510 may store information about communications between a language model and a user, human agent context 520 may store information about communications between a language model and a human agent, and API context 530 may store information about communications between a language model and an API endpoint. In some implementations, the different contexts may use different language models. For example, some contexts may require higher quality responses, a longer context window, and/or larger language model may be used to provide the higher quality responses. Longer context windows and/or larger language models may increase the cost of each interaction with the language model. By tailoring the language model to the context, the required quality of the automated support may be obtained in a cost-effective manner.

Each of the three contexts may store different information for the reasons indicated above. Each context, however, may need information from another context to perform desired processing.

For example, user context 510 may determine that an API call needs to be performed and provide an indication of the needed API call. This indication may be sufficient to specify the API call but may not have sufficient information to actually perform the API call. Information from user context 510 may be copied to API context 530 to allow the language model of API context 530 to determine the actual API call. This information may be referred to as context transfer information.

The context transfer information may be determined using any appropriate techniques. In some implementations, a language model may process user context 510 to determine the context transfer information (e.g., by generating a prompt to instruct the language model determine the context transfer information from the user context). This language model may be the language model of user context 510, the language model of API context 530, or a different language model. The context transfer information may include information such as a summary of user context 510, the indication of the API call, and information about values likely needed to perform the API call. In some implementations, rule-based or other approaches may be used instead. For example, a specified number of most recent communications may be copied from one context to another context.

The context transfer information may then be presented in API context 530. The language model of API context 530 may use the context transfer information (e.g., indication of the API call) to generate complete details of what is needed to perform the actual API call (e.g., whether the call is a GET or a POST, a uniform resource locator for the API call, and argument names and values to be used in the API call).

After the API response is received in API context 530, information about the API response may need to be copied back to user context 510. Context transfer information may be generated that includes the information needed by user context 510 but also excludes information that is not needed, such as sensitive information (e.g., API keys) or extraneous information. In the example of FIG. 5, the language model of API context 530 is used to process the actual API response to generate a representation of the API response that may be used as context transfer information and copied to user context 510.

For another example, user context 510 may determine to request assistance from a human agent and provide an indication of the request, such as a question to ask a human agent. The indication of the request may not have sufficient information for a human agent to respond to the request, as the human agent may need additional information, such as previous communications or information about the user. Information from user context 510 may be copied to human agent context 520 to allow a human agent to provide a response. This information may also be referred to as context transfer information, and may be determined as described above.

The context transfer information may then be presented in human agent context 520. Because the human agent may also be interacting with a language model, the human agent may ask questions of the language model to obtain additional information. In the example, of FIG. 5, the human agent is being asked whether to grant an extension to the user, and the human agent asks the language model if the user has previously requested an extension. This language model may also perform API calls to obtain the needed information and an API context (either the same one as API context 530 or a different one) may be used in performing the API call.

After a response from the human agent is received in human agent context 520, information about the human agent response may need to be copied back to user context 510. Context transfer information may be generated that includes the information needed by user context 510 but also excludes information that is not needed, such as sensitive information (e.g., company confidential information) or extraneous information.

In some implementations, communications between the language model and the human agent may also be implemented as described in FIG. 4 where the human agent is in the role of the "user" of FIG. 4 and a supervisory human agent is in the role of the "human agent" of FIG. 4. The human agent may interact with the language model, API calls may be performed as needed or requested, and assistance from a supervisory human agent may be obtained when determined by the language model or when requested by the human agent.

Similarly, in some implementations, communications between the language model and the API endpoint may also be implemented as described in FIG. 4 where the API endpoint is in the role of the "user" of FIG. 4 and a different human agent (e.g., a more technical human agent) may provide assistance when an API call is not working or if there is uncertainty about how to perform an API call.

Figure 6:
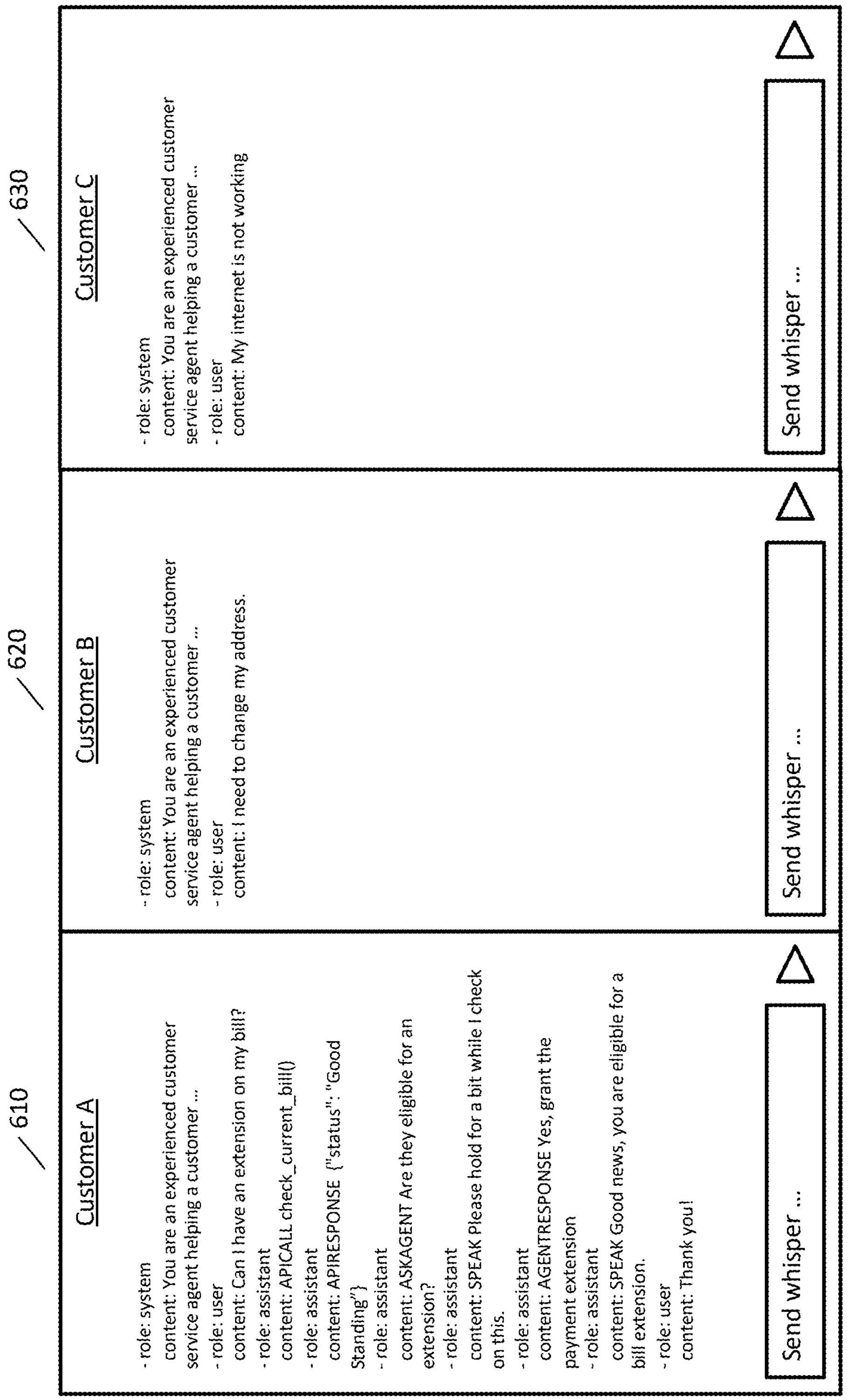
FIG. 6 is an example user interface where a human agent may monitor automated support sessions and send an unsolicited human agent communication to an automated support session.

FIG. 6 is an example user interface where a human agent may monitor automated support sessions and send an unsolicited human agent communication or a whisper to an automated support session. In FIG. 6, the human agent is monitoring three automated support sessions: first automated support session 610, second automated support session 620, and third automated support session 630. A human agent may monitor any appropriate number of automated support sessions and is not limited to three.

For each support session, the human agent may view information about the automated support session. In some implementations, the human agent may be able to view the entire user context. In some implementations, the human agent may be able to view a part of or a representation of the user context, and this may be implemented using context transfer information as described herein. For each support session, a user interface may be presented to allow the agent to send an unsolicited human agent communication to the language model of the automated support session. For example, where the language model of the automated support session is performing an incorrect action or communicating with an inappropriate style (e.g., too casually) the human agent may try to improve the automated support session by providing guidance to the language model. In some implementations, the human agent may only be able to provide guidance to the language model, and it is not possible for the human agent to communicate directly with the user being assisted in the automated communications session.

In some implementations, the human agent may also be presented with a user interface (not shown in FIG. 6) to interact with a separate language model to obtain additional information about an automated support session. The human agent may have back and forth communications with the language model as described herein. Any appropriate user interface may be used to allow a human agent to interact with a language model while monitoring automated support sessions.

In some implementations, automated techniques may be used to identify support sessions that are in greater need of monitoring by a human agent. A user context may be processed to determine a score for the quality of the support session. For example, the score may indicate a sentiment of the user or a likelihood that the support task is being handled correctly. The session quality scores may be presented to the human agent. The session quality scores may also be used to determine which support sessions to present to the agent for monitoring. For example, the lowest scoring sessions may be shown to human agents. The session quality scores may be computed using any appropriate techniques, such as by asking a language model to determine the score or by training a neural network to compute the score using labelled training data.

In some implementations, a human agent monitoring automated support sessions may also be sent a request for assistance from the language model of the automated support session as described herein. The human agent may be presented with a user interface (not shown in FIG. 6) to receive and respond to requests as described herein. Any appropriate user interface may be used to allow a human agent to receive and respond to requests from a language model of an automated support session.

Figure 7:
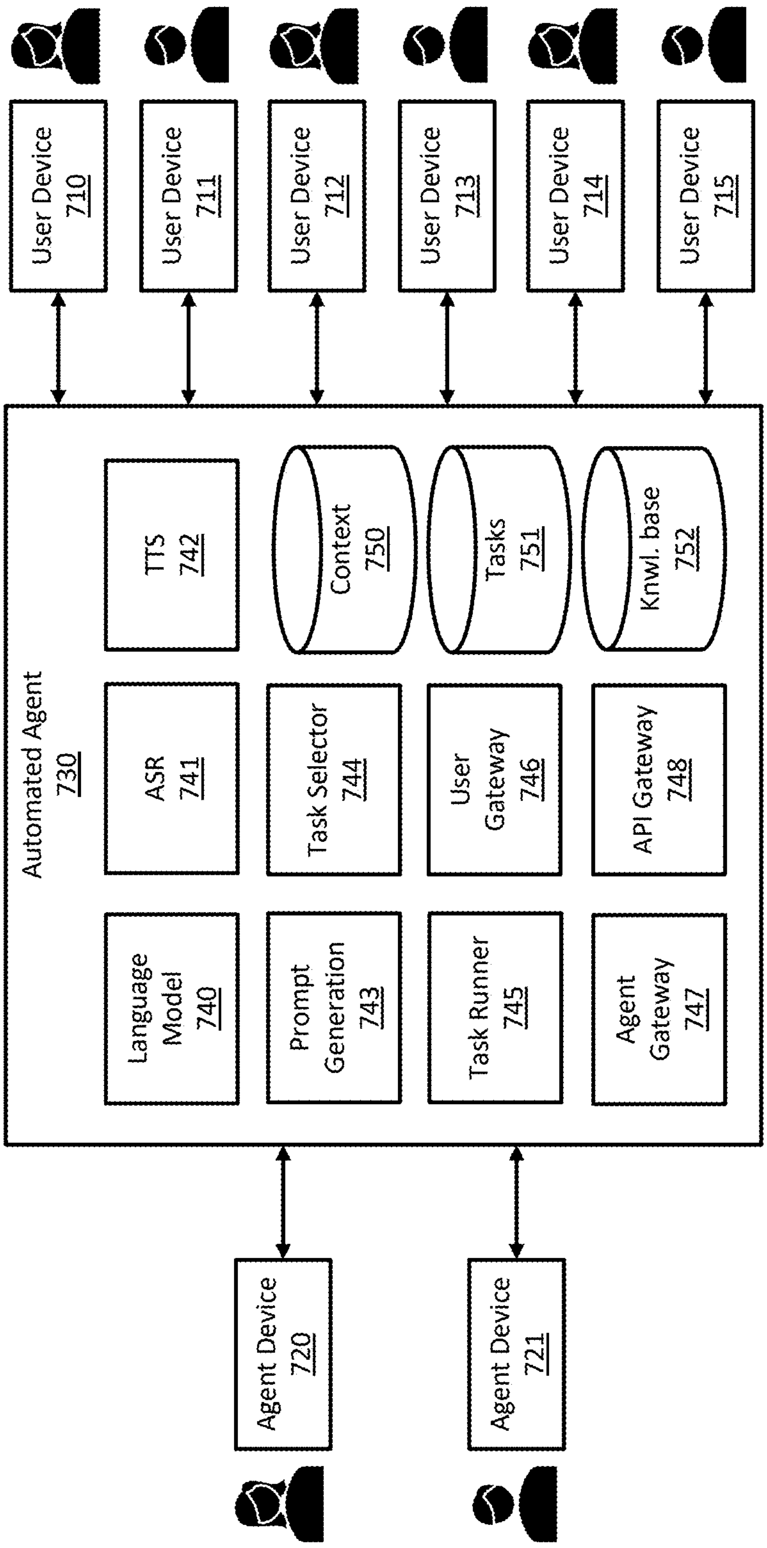
FIG. 7 is an example system for providing automated support to users where a human agent may provide input to a language model.

FIG. 7 is an example system for providing automated support to users where a human agent may provide input to a language model.

In FIG. 7, users, such as users with user devices 710-715 may be receiving automated support. The automated support may use text, voice, video, or any other natural language communication. Communications with users may be automated in that they are generated using a language model. In some implementations, all communications with the user are automated and the user is not able to speak with a human agent.

Human agents, such as human agents with agent devices 720 and 721 may assist the automated support with the users. As described herein, the human agents may respond to requests generated by a language model or may monitor support sessions and provide unsolicited input to the language model to improve the performance of the language model. Human agent communications may use text, voice, video, or any other natural language communication. Communications to human agents may also be automated in that they are generated using a language model.

Automated agent 730 may include or have access to a variety of components, such as the example components and datastores shown in FIG. 7. The components of automated agent 730 may be implemented on a single computing device or may be distributed among multiple computing devices, such as a system of computing devices, including, for example, an end-user computing device (e.g., a smartphone or a tablet) and/or a server computer (e.g., cloud computing).

Language model 740 may be used to process and generate natural language communications or other communications, such as API calls. Language model 740 may include any appropriate language model, such as a large language model. Language model 740 may be implemented locally or may be provided by a third party.

Automatic speech recognition (ASR) component 741 may be used to convert audio communications to text, such as audio communications received from a user, from a human agent, or form any other person. Any appropriate automatic speech recognition technology may be used.

Text-to-speech (TTS) component 742 may be used to convert text to an audio communication to be presented to a user, a human agent, or any other person. Any appropriate text-to-speech technology may be used.

Prompt generation component 743 may facilitate the generation of prompts to be submitted to a language model. Prompt generation component 743 may be implemented using any appropriate techniques to generate a prompt, such as any of the techniques described herein. In some implementations, prompt generation component 743 may use techniques such as retrieval augmented generation to generate a prompt.

Task selector component 744 may determine a task to be performed with a user. Task selector component 744 may be implemented using any appropriate techniques, such as selecting a task by processing a user communication with a classifier or a language model.

Task runner component 745 may facilitate the completion of a task using a language model. Task runner component 745 may be implemented using any appropriate techniques, such as the processing of FIG. 4.

User gateway component 746 may facilitate receiving communications from a user and transmitting communications to a user. User gateway component 746 may be implemented using any appropriate techniques, such any of the communication techniques described herein.

Agent gateway component 747 may facilitate receiving communications from a human agent and transmitting communications to a human agent. Agent gateway component 747 may be implemented using any appropriate techniques, such any of the communication techniques described herein.

API gateway component 748 may facilitate transmitting an API call to an API endpoint and receiving an API response from the API endpoint. API gateway component 748 may be implemented using any appropriate techniques, such any of the techniques described herein.

Context datastore 750 may store contexts used in communications sessions with any of users, human agents, and API endpoints. The stored contexts may include any of the contexts described herein, such as user contexts, human agent contexts, or API contexts.

Tasks datastore 751 may store any appropriate information about tasks that may be performed for users. For example, information about tasks may include one or more prompt templates that may be used to generate prompts to be submitted to assist in completing the tasks. The prompt templates may be used for any of communications with users, human agents, or API endpoints.

Knowledge base datastore 752 may store any appropriate knowledge that may be used to assist a user. For example, the knowledge base may include any of information about users (e.g., profile information), information about a company's products or services, or troubleshooting information. Knowledge base datastore 752 may be accessed during task processing, such as by performing API calls to retrieve information from a knowledge base or another database.

Figure 8:
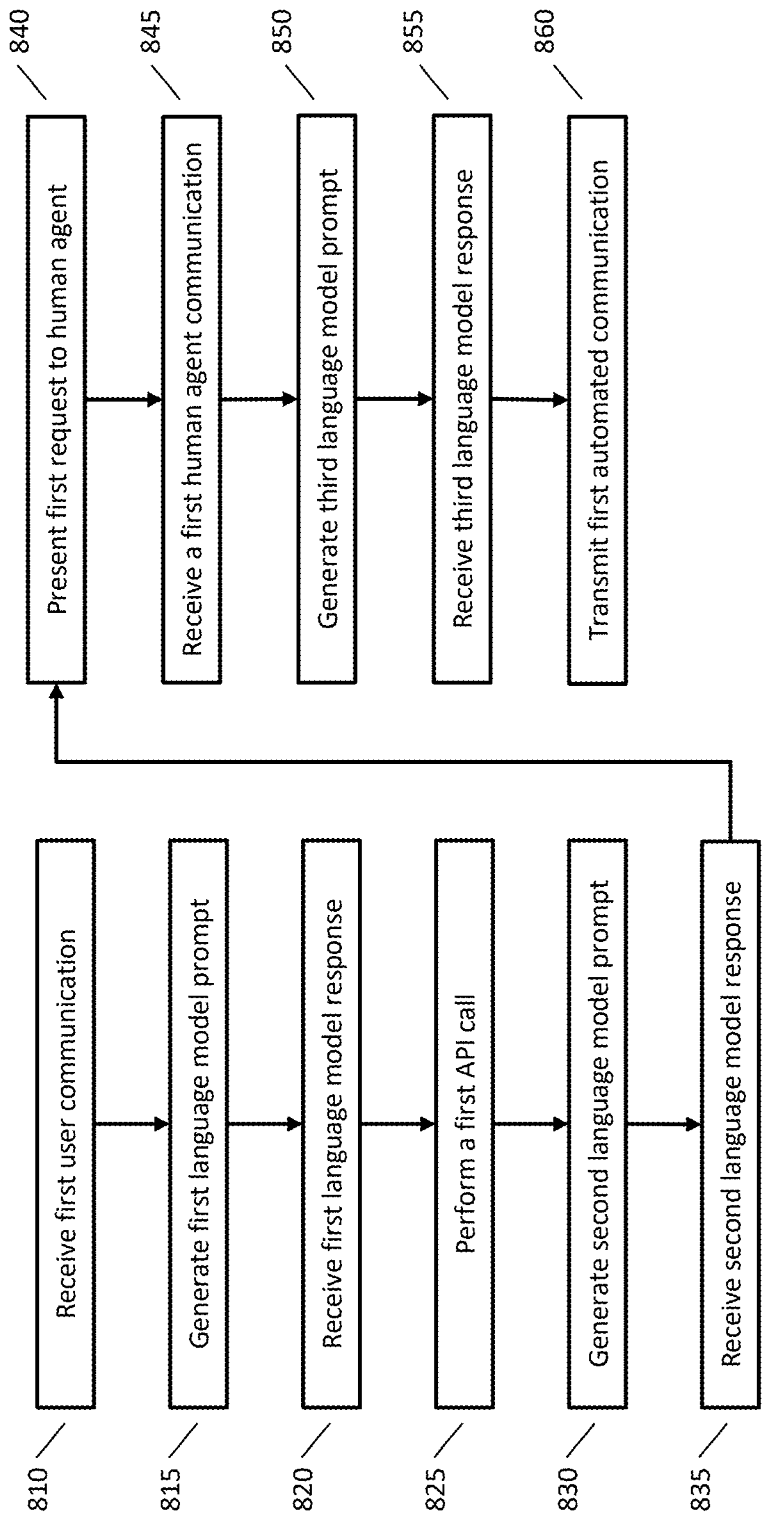
FIG. 8 is a flowchart of an example method for implementing an automated support process using a language model.

FIG. 8 is a flowchart of an example method for implementing an automated support process using a language model.

At step 810, a first user communication is received from a user as a part of a communications session. The first user communication may be received using any appropriate techniques, such as any of the techniques described herein. The first user communication may be received for any appropriate purpose, such as for receiving support from a company.

At step 815, a first language model prompt is generated using a representation of the first user communication. The representation may be a transcription of an audio communication received from the user, a text communication received from the user, or a modification of the foregoing (e.g., a summarization or other post processing). In some implementations, the first language model prompt may be created using a first session context where the first session context includes representations of communications of the support session (e.g., communications with the user, a human agent, or an API endpoint). The language model prompt may be generated from a language model prompt template, such as a language model prompt template corresponding to a task that is being performed for the user. The first language model prompt may describe one or more language model response types, such as any of the language model response types described herein. The first language model prompt may instruct the language model to return a first language model response having a first language model response type corresponding to one of the described language model response types.

At step 820, a first language model response is received using the first language model prompt. The first language model response may be received using any appropriate techniques, such as any of the techniques described herein. For example, the language model may be implemented locally or the language model response may be obtained from a third party using an API of the third party. In some instances, the first language model response type may correspond to performing an API call, and the first language model response may include a representation of a first API call to be performed.

At step 825, the first API call is performed. The first API call may be performed using any appropriate techniques, such as any of the techniques described herein. The first API call may return a first API response. In some implementations, the first API call may be performed using a second session context that is different from the first session context, such as an API context. Information may be transferred between the first session context and the second session context using context transfer information.

At step 830, a second language model prompt is generated using the representation of the first user communication and a representation of the first API response. The representation of the first API response may be the actual first API response or a modification thereof (e.g., processed to remove extraneous or sensitive information). In some implementations, the second language model prompt may also include a representation of the first API call. The second language model prompt may be generated using any of the techniques described for generating the first language model prompt.

At step 835, a second language model response is received using the second language model prompt. The second language model response may be received using any of the techniques described for receiving the first language model response. In some instances, the second language model response type may correspond to requesting assistance from a human agent, and the second language model response may include a representation of a first request to be presented to a human agent, such as text of a question to be asked to the human agent.

At step 840, a first request is presented to a human agent. The first request may be presented to the human agent using any appropriate techniques, such as any of the techniques described herein. For example, software or a processor may cause the first request to be presented to the human agent by performing an API call.

At step 845, a first human agent communication is received from the human agent. The first human agent communication may be received using any appropriate techniques, such as any of the techniques described herein.

In some implementations, the request to the human agent be performed using a third session context that is different from the first session context, such as a human agent context. Information may be transferred between the first session context and the third session context using context transfer information. In some implementations, a human agent may interact with a language model as described herein.

At step 850, a third language model prompt is generated using the representation of the first user communication, the representation of the first API response, and a representation of the first human agent communication. The representation may be a transcription of an audio communication received from the human agent, a text communication received from the human agent, or a modification of the foregoing (e.g., a summarization or other post processing). In some implementations, the second language model prompt may also include a representation of the first API call or a representation of the first request to the human agent. The third language model prompt may be generated using any of the techniques described for generating the first language model prompt.

At step 855, a third language model response is received using the third language model prompt. The third language model response may be received using any of the techniques described for receiving the first language model response. In some instances, the third language model response type may correspond to transmitting a communication to the user, and the third language model response may include a representation of a first automated communication to be transmitted to the user.

At step 860, the first automated communication is transmitted to the user. The first automated communication may be presented to the user using any appropriate techniques, such as any of the techniques described herein. For example, software or a processor may cause the first automated communication to be presented to the user by performing an API call.

The steps of FIG. 8 may be modified to incorporate other aspects described herein. In the example of FIG. 8 above, the language model specified an API call, followed by a request to a human agent, and followed by a communication to the user. In other examples, the order may be different and additional actions may be performed. For example, more than one API call may be performed, more than one human agent request may be made, and more than one automated communication may be transmitted to the user. The techniques described in FIG. 8 may be combined with the techniques described in FIGS. 3-7 using techniques known to one of skill in the art.

Figure 9:
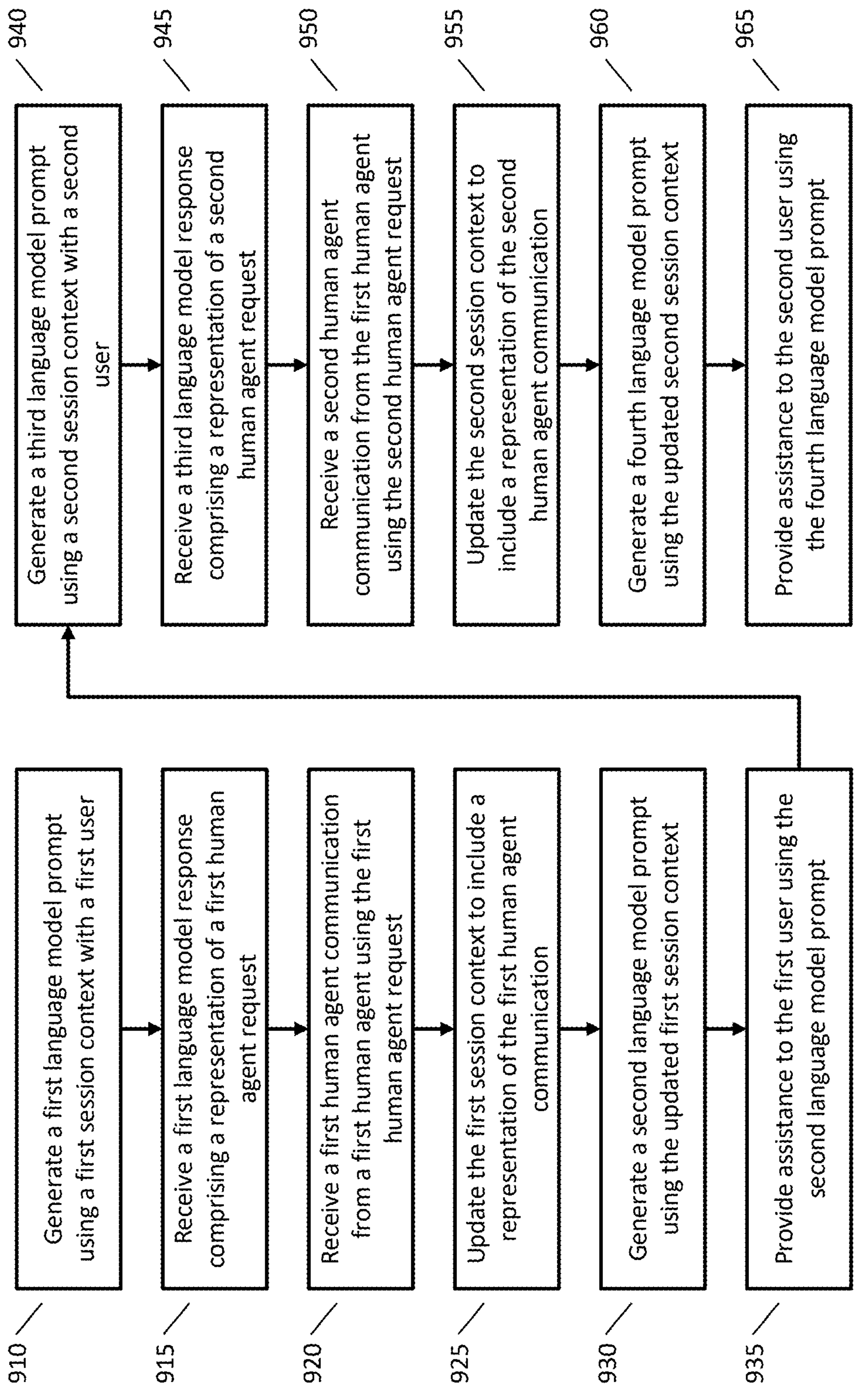
FIG. 9 is a flowchart of an example method for implementing an automated support process with multiple support sessions requesting assistance from a human agent.

FIG. 9 is a flowchart of an example method for implementing an automated support process with multiple support sessions requesting assistance from a human agent. For example, as illustrated in FIG. 7, a single human agent, such as the human agent at agent device 720 may be available to respond to requests from multiple automated support sessions that may be providing automated support to multiple users.

At step 910, a first language model prompt is generated using a first session context with a first user. The first user may be seeking support from a company and using an automated support process provided by the company. The language model prompt and the first session context may be created using any appropriate techniques, such as any of the techniques described herein. For example, the language model prompt may instruct the language model to select a language model response type where one of the language model response types is to request assistance from a human agent.

At step 915, a first language model response is received where the language model response indicates that assistance should be requested from a human agent and includes a representation of a first human agent request. For example, the language model response may include text of a question to present to a human agent.

At step 920, a first human agent communication is received from a first human agent using the first human agent request. For example, processing may cause the first human agent request (e.g., text of a question) to be presented to the first human agent on a device (e.g., on a computer or mobile device). The device may present a user interface that allows the first human agent to enter the first human agent communication. The device may also allow the first human agent to interact with a language model using a context as described herein. The first human agent communication may be received using any appropriate techniques, such as any of the techniques described herein.

At step 925, the first session context is updated to include a representation of the first human agent communication. The first session context may be updated using any appropriate techniques, such as any of the techniques described herein.

At step 930, a second language model prompt is generated using the updated first session context. Because the first session context includes a representation of the first human agent communication, the language model prompt is instructing the language model to follow the instructions of the first human agent. The second language model prompt may be generated using any appropriate techniques, such as any of the techniques described herein.

At step 935, automated assistance is provided to the first user using the second language model prompt. For example, a second language model response may be received using the second language model prompt, and subsequent actions may include performing API calls, transmitting a communication to the first user, or seeking additional support from the first human agent (or possibly a different human agent).

The first human agent may also support an additional support session with a second user as described at steps 940-965. At step 940, a third language model prompt may be generated using a second session context with the second user. At step 945, a third language model response may be received where the language model response indicates that assistance should be requested from a human agent and includes a representation of a second human agent request. At step 950, a second human agent communication is received from the first human agent using the second human agent request. At step 955, the second session context is updated to include a representation of the second human agent communication. At step 960, a fourth language model prompt is generated using the updated second session context. Because the second session context includes a representation of the second human agent communication, the language model prompt is instructing the language model to follow the instructions of the first human agent. At step 965, automated assistance is provided to the second user using the fourth language model prompt.

This process may be repeated where the first human agent is similarly supporting automated support sessions with other users. The number of support sessions that the human agent support may depend on the quality of the automated support process and/or the complexity of the support requests. For example, where the automated support process has high reliability and assistance from a human agent is not frequently needed, a single human agent may be able to support a large number of automated support sessions, such as tens, hundreds, or possibly thousands of automated support sessions. Additional human agents may be added to further increase the total number of automated support sessions that may be provided to users.

Figure 10:
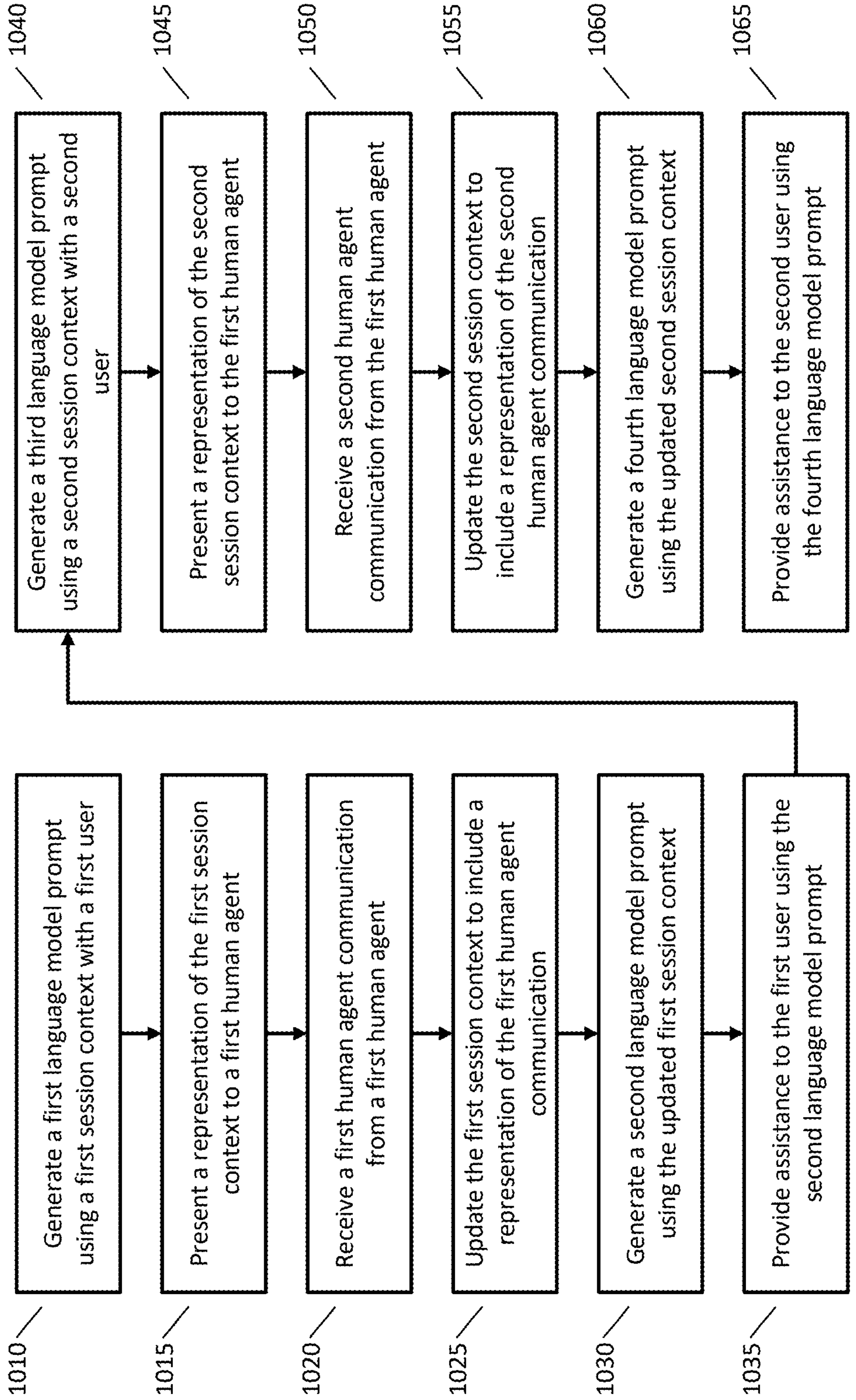
FIG. 10 is a flowchart of an example method for implementing an automated support process with a human agent monitoring multiple support sessions.

FIG. 10 is a flowchart of an example method for implementing an automated support process with a human agent monitoring multiple support sessions. For example, as illustrated in FIG. 7, a single human agent, such as the human agent at agent device 720 may monitor multiple support sessions with end users. A human agent may use a user interface, such as the user interface of FIG. 6, to monitor multiple support sessions.

At step 1010, a first language model prompt is generated using a first session context with a first user. This step may be performed as described herein, such as at step 910 of FIG. 9.

At step 1015, a representation of the first session context is presented to a first human agent. Any appropriate representation of the first session context may be presented to the first human agent. For example, the representation may be the full context, recent items of the context, a summary of the context, or any combination thereof. The representation of the first session context may be presented to the first human agent using any appropriate techniques, such as any of the techniques described herein. For example, that first human agent may use a device that presents a user interface in a web browser and API calls may be performed to present the representation of the session context in the web browser.

At step 1020, a first human agent communication is received from the first agent. In some instances, the first human agent may be reviewing the first session context and determine to provide feedback to fix a mistake in or otherwise improve the quality of the automated support being provided to the first user. The first human agent communication may include any form of natural language, such as text or speech, and the content of the communication may be any appropriate content to improve the performance of the automated support process. The first human agent communication may be received using any appropriate techniques, such as any of the techniques described herein.

In some implementations, the first human agent communication may be unsolicited in that no request for assistance was presented to the first human agent. In some implementations, the automated support process may not be able to request assistance from the first human agent (e.g., the automated support process is not configured to request assistance from any human agents or is only configured to request assistance from other human agents).

At step 1025, the first session context is updated to include a representation of the first human agent communication. This step may be performed as described herein, such as at step 925 of FIG. 9.

At step 1030, a second language model prompt is generated using the updated first session context. This step may be performed as described herein, such as at step 930 of FIG. 9.

At step 1035, automated assistance is provided to the first user using the second language model prompt. This step may be performed as described herein, such as at step 935 of FIG. 9.

The first human agent may also monitor an additional support session with a second user as described at steps 1040-1065. At step 1040, a third language model prompt may be generated using a second session context with the second user. At step 1045, a representation of the second session context is presented to the first human agent. At step 1050, a second human agent communication is received from the first human agent. At step 1055, the second session context is updated to include a representation of the second human agent communication. At step 1060, a fourth language model prompt is generated using the updated second session context. Because the second session context includes a representation of the second human agent communication, the language model prompt is instructing the language model to follow the instructions of the first human agent. At step 1065, automated assistance is provided to the second user using the fourth language model prompt This process may be repeated where the first human agent is similarly monitoring automated support sessions with other users. The number of support sessions that the human agent monitor may depend on the quality of the automated support process and/or the complexity of the support requests as described herein. Session quality scores may be used to select support sessions for monitoring. Additional human agents may be added to further increase the total number of automated support sessions that may be monitored simultaneously.

Figure 11:
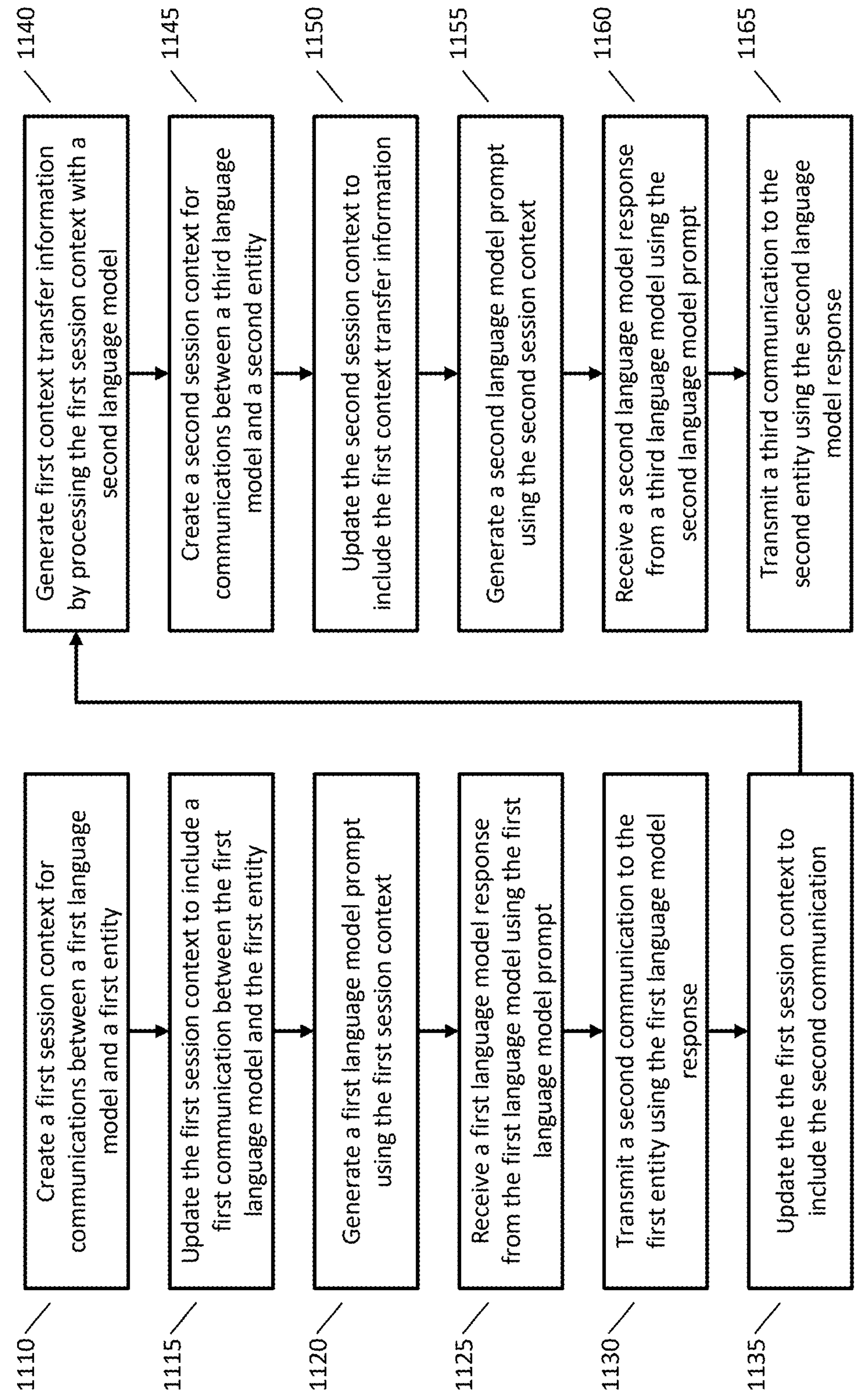
FIG. 11 is a flowchart of an example method for transferring context information from one session context to another session context.

FIG. 11 is a flowchart of an example method for transferring context information from one session context to another session context. The session contexts may include any of the contexts described herein, such as a user context, an API context, or a human agent context.

At step 1110, a first session context is created for communications between a first language model and a first entity. The first entity may be any appropriate entity, such as user, a human agent, or an API endpoint. The first session context may be created using any appropriate techniques, such any of the techniques described herein. The communications many include any appropriate communication, such as any of the communications described herein.

At step 1115, the first session context is updated to include a first communication between the first language model and the first entity. For example, the first communication may include any of the following: a communication from a user, an automated communication to the user, a request for assistance to a human agent, a communication from a human agent, an API call, or a response to an API call. The first session context may be updated using any appropriate techniques, such as any of the techniques described herein.

At step 1120, a first language model prompt is created using the first session context. The first language model prompt may be created using any appropriate techniques, such as any of the techniques described herein.

At step 1125, a first language model response is received from the first language model using the first language model prompt. The first language model response may be received using any appropriate techniques, such as any of the techniques described herein.

At step 1130, a second communication is transmitted to the first entity using the first language model response. The second communication may be transmitted using any appropriate techniques, such as any of the techniques described herein.

At step 1135, the first session context is updated to include the second communication. The first session context may be updated using any appropriate techniques, such as any of the techniques described herein.

At step 1140, first context transfer information is generated by processing the first session context with a second language model. In some implementations, the second language model may be the same language model as the first language model. In some implementations, the second language model may be a different language model than the first language model. For example, as compared to the first language model, the second language model may be more or less expensive, may have fast or slower response times, or may have longer or shorter context windows. The first context transfer information may be generated using any appropriate techniques, such as any of the techniques described herein.

In some implementations, a language model prompt may be created to instruct the second language model to create the first context transfer information from the first session context. The language model prompt may provide instructions to the second language model for creating the first context transfer information. For example, the instructions may include any of the following: remove extraneous information, remove pleasantries, summarize the first session context, remove personal information, remove proprietary information, or remove sensitive information.

At step 1145, a second session context is created for communications between a third language model and a second entity. The second session context may be created using any appropriate techniques, such as any of the techniques described herein. In some implementations, the third language model may be the same as the first or second language models or may be different from both of them for the reasons described herein.

At step 1150, the second session context is updated to include the first context transfer information. The second session context may be updated using any appropriate techniques, such as any of the techniques described herein.

At step 1155, a second language model prompt is generated using the second session context. The second language model prompt may be generated using any appropriate techniques, such as any of the techniques described herein.

At step 1160, a second language model response is received from the third language model using the second language model prompt. The second language model response may be received using any appropriate techniques, such as any of the techniques described herein.

At step 1165, a third communication is transmitted to the second entity using the second language model response. The third communication may be transmitted using any appropriate techniques, such as any of the techniques described herein.

Additional context information may be used to transfer information from the second session context back to the first session context. For example, second context transfer information may be created by processing the second session context with a fourth language model. The first session context may then be updated to include the second context transfer information, and an additional language model prompt may be generated using the further updated first session context.

Figure 12:
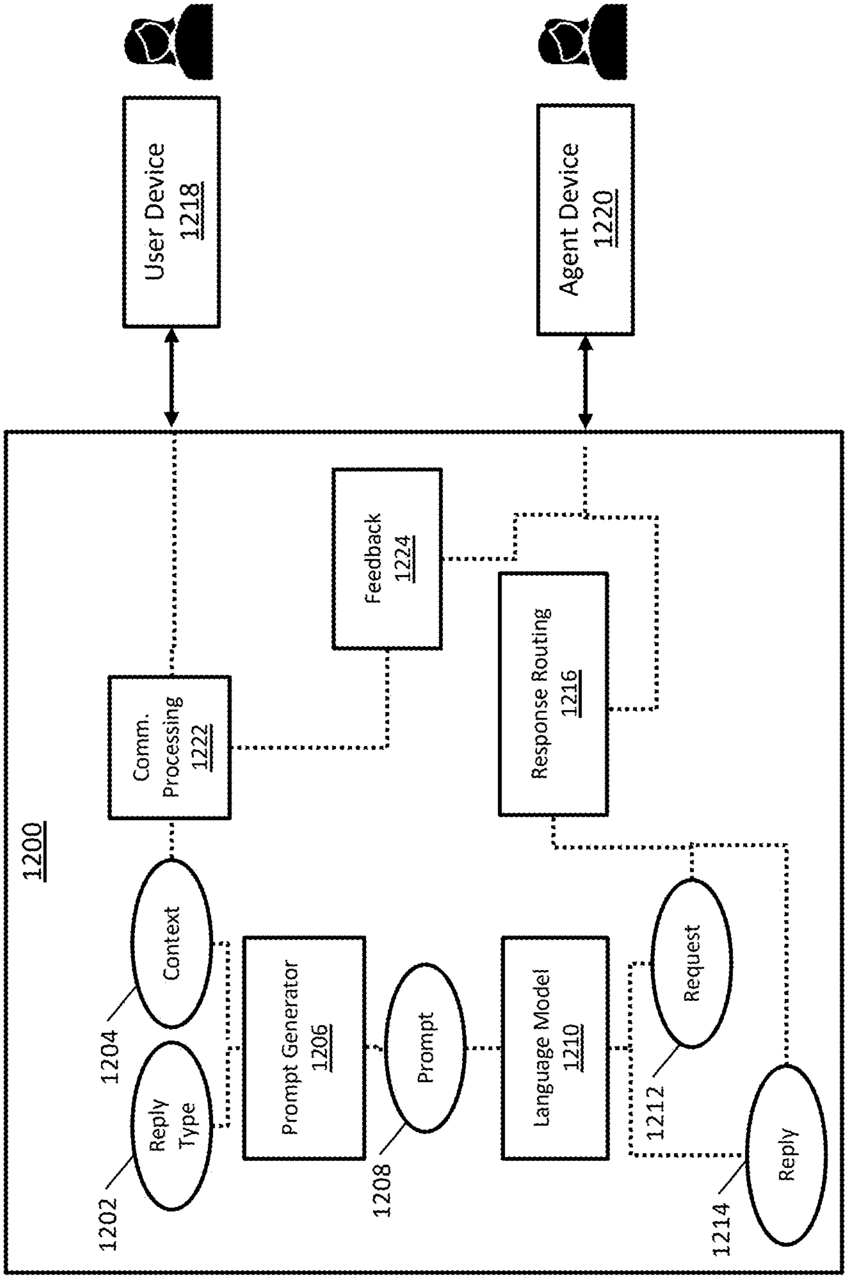
FIG. 12 is an example apparatus where a human agent may provide input to a language model during an automated support session.

FIG. 12 is a schematic depiction an example apparatus 1200 where a human agent may provide input to a language model during an automated support session. Apparatus 1200 includes communication processing circuit 1222. Communication processing circuit 1222 may receive communications from user device 1218 and/or agent device 1220 and generate session context 1204. Communication processing circuit 1222 may also receive communications from other user devices and agent devices. In some implementations, session context 1204 may include a representation of a user communication. Apparatus 1200 further includes prompt generator circuit 1206. Prompt generator circuit 1206 may receive context 1204 and language model response type specifications 1202 and may generate prompt 1208. Prompt 1208 may be generated to include elements of context 1204 such as a representation of a communication. Prompt 1208 may further include one or more descriptions of language model response type specifications 1202. In one example, the descriptions of the language model response types may be generated from the language model response type specifications 1202. The description may include a description that describes that a response may include transmitting a reply to a user, a description that a response may include generating a request for assistance from a human agent, and/or a description that describes that a response may include performing an API call.

Apparatus 1200 includes language model 1210 that is configured to receive prompt 1208 and generate a response to prompt 1208. The generated response may include different types of responses, and the types of responses may correspond to one of the response types described in the prompt. In one example, the response may be reply 1214, that includes a communication to be presented to a user. In another example, the response may be a request 1212 that includes a request for assistance from a human agent. The response from language model 1210 may include a natural language response that includes an implicit or explicit indication of the type of response.

Apparatus 1200 includes response routing circuit 1216. Response routing circuit 1216 may be configured to receive the response from language model 1210, detect the type of response, and route the response to an appropriate destination. For example, reply 1214 may be routed back to user device 1218. A request 1212 for assistance from a human agent may be routed to agent device 1220. In some implementations, routing circuit 1216 may determine the routing for the reply by identifying keywords in the reply, processing the reply with a classifier, processing with machine learning models, or using any other appropriate techniques. In some implementations, routing may include marking the reply with an indication of the type of reply and/or its intended recipient, addressing a communication packet to an address of the intended recipient, or using any other appropriate techniques.

Apparatus 1200 may include feedback circuit 1224 that may be configured to collect feedback from the human agent regarding the session context or communications within the session context. The collected feedback may be collected from the human agent using any appropriate techniques. For example, agent device 1220 may present the request for assistance to the human agent along with a representation of the session context, allow the human agent to provide a response (e.g., by typing a natural language text response or selecting one or more options from drop-down menus), and transmit the response for further processing (e.g., via an API call). The feedback may be stored in a storage unit (not shown) that is local to or remote from apparatus 1200. The feedback may be provided to communication processing circuit 1222 and used to update session context 1204. Updated session context that includes the feedback may be used as input to prompt generator circuit 1206 and/or language model 1210 to generate subsequent replies.

In some implementations, response routing circuit 1216 may be configured to route responses from language model 1210 to a human agent, allowing the human agent to monitor responses from language model 1210 and provide feedback that may include interjections. The feedback from the human agent may be used to update session context 1204. Representation of the interjections from the human agent may be included in the session context and included in subsequent prompts 1208.

In some implementations, communication processing circuit 1222 may be configured to provide another human agent, which may be an agent that is not involved in a session, with session context 1204. Session context 1204 may include a history of the communications from the user and language model 1210. The human agent may provide feedback regarding the session, communications of the session, tone of the communications, or any other appropriate feedback. The feedback from the human agent may be collected by feedback circuit 1224 and used to update session context 1204. Representation of the feedback from the human agent may be included in the session context and included in subsequent prompts 1208.

A circuit and/or a component, as used herein, includes one or more hardware aspects configured to perform the operations of the circuit and/or component, for example a logic circuit, a hardware element configured to be responsive to perform operations of the circuit, executable code stored on a computer-readable medium and configured to cause a processor to perform one or more operations of the circuit and/or component when executed, and/or combinations of the foregoing. A circuit and/or component should be understood broadly to describe a configuration of hardware and/or executable instructions, including elements that are cooperative directly and/or logically, to perform the operations of the circuit and/or component.

Figure 13:
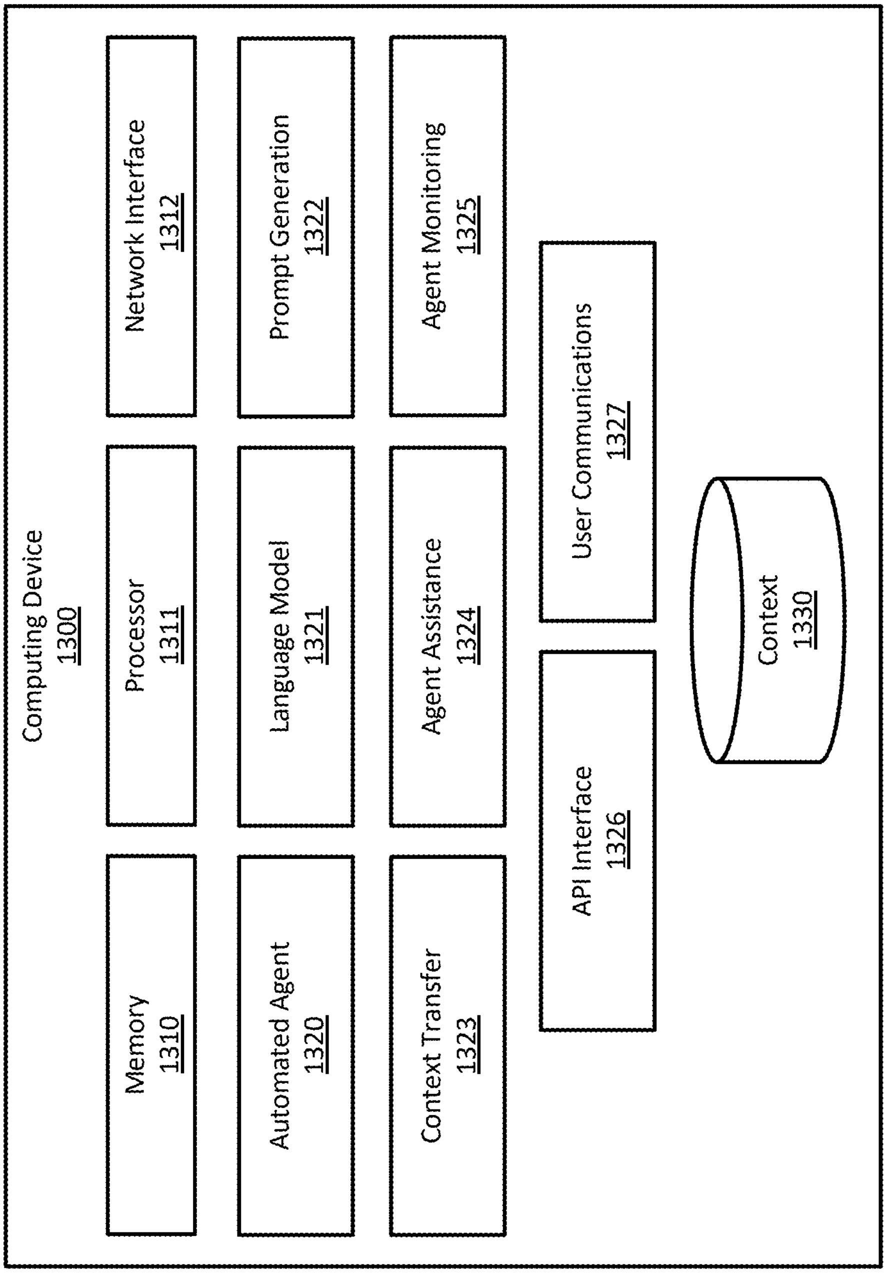
FIG. 13 illustrates components of one implementation of a computing device for implementing any of the techniques described herein.

FIG. 13 illustrates components of one implementation of a computing device 1300 for implementing any of the techniques described herein. In FIG. 13, the components are shown as being on a single computing device, but the components may be distributed among multiple computing devices, such as a system of computing devices, including, for example, an end-user computing device (e.g., a smartphone or a tablet) and/or a server computer (e.g., cloud computing).

Computing device 1300 may include any components typical of a computing device, such as volatile or nonvolatile memory 1310, one or more processors 1311, and one or more network interfaces 1312. Computing device 1300 may also include any input and output components, such as displays, keyboards, and touch screens. Computing device 1300 may also include a variety of components or modules providing specific functionality, and these components or modules may be implemented in software, hardware, or a combination thereof. Computing device 1300 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 1300 may have an automated agent component 1320 that may be used to provide automated support sessions to end users using any of the techniques described herein. Computing device 1300 may have a language model component 1321 that may be used to generate language model responses to prompts using any of the techniques described herein. Computing device 1300 may have a prompt generation component 1322 that may be used to generate language model prompts using any of the techniques described herein. Computing device 1300 may have a context transfer component 1323 that may be used to transfer information between session contexts using any of the techniques described herein. Computing device 1300 may have an agent assistance component 1324 that may be used to allow a language model to request assistance from a human agent using any of the techniques described herein. Computing device 1300 may have an agent monitoring component 1325 that may allow a human agent to monitor and influence automated support sessions using any of the techniques described herein. Computing device 1300 may have an API interface component 1326 that may allow a language model to perform API calls using any of the techniques described herein. Computing device 1300 may have a user communication component 1327 that may allow a language model to transmit communications to an end user using any of the techniques described herein.

Computing device 1300 may include or have access to various data stores. Data stores may use any known storage technology such as files, relational databases, non-relational databases, or any non-transitory computer-readable media. Computing device 1300 may have a context data store 1330 that stores any appropriate information for using one or more contexts for interacting with language models.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in their entirety.

What is claimed is:

1. A computer-implemented method, comprising:

creating a first session context for communications between a first language model and a first entity;

updating the first session context to include a representation of a first communication between the first language model and the first entity;

generating a first language model prompt using the first session context;

receiving a first language model response from the first language model using the first language model prompt;

causing a second communication to be transmitted to the first entity using the first language model response;

updating the first session context to include a representation of the second communication;

generating context transfer information by processing the first session context with a second language model;

creating a second session context for communications between a third language model and a second entity;

updating the second session context to include a representation of the context transfer information;

generating a second language model prompt using the second session context;

receiving a second language model response from the third language model using the second language model prompt; and causing a third communication to be transmitted to the second entity using the second language model response.

2. The computer-implemented method of claim 1, wherein generating the context transfer information comprises instructing the first language model to summarize the first session context.

3. The computer-implemented method of claim 1, wherein generating the context transfer information comprises instructing the first language model to exclude extraneous or sensitive information from the first session context.

4. The computer-implemented method of claim 1, wherein:

the second language model is a different language model than the first language model;

the third language model is a different language model than the first language model; and the third language model is a different language model than the second language model.

5. The computer-implemented method of claim 1, wherein:

the second language model is the first language model; and the third language model is the first language model.

6. The computer-implemented method of claim 1, comprising:

generating second context transfer information by processing the second session context with a fourth language model; and updating the first session context to include a representation of the second context transfer information.

7. The computer-implemented method of claim 1, comprising:

creating a third session context for communications between a fourth language model and a third entity;

generating second context transfer information by processing the first session context with the second language model; and updating the third session context to include a representation of the second context transfer information.

8. The computer-implemented method of claim 1, wherein generating the context transfer information comprises instructing the first language model to exclude extraneous or sensitive information from the first session context.

9. A system, comprising at least one server computer comprising at least one processor and at least one memory, the at least one server computer configured to:

create a first session context for communications between a first language model and a first entity;

update the first session context to include a representation of a first communication between the first language model and the first entity;

generate a first language model prompt using the first session context;

receive a first language model response from the first language model using the first language model prompt;

cause a second communication to be transmitted to the first entity using the first language model response;

update the first session context to include a representation of the second communication;

generate context transfer information by processing the first session context with a second language model;

create a second session context for communications between a third language model and a second entity;

update the second session context to include a representation of the context transfer information;

generate a second language model prompt using the second session context;

receive a second language model response from the third language model using the second language model prompt; and cause a third communication to be transmitted to the second entity using the second language model response.

10. The system of claim 9, wherein the at least one server computer is configured to generate the context transfer information by instructing the first language model to summarize the first session context.

11. The system of claim 9, wherein the at least one server computer is configured to generate the context transfer information by instructing the first language model to exclude extraneous or sensitive information from the first session context.

12. The system of claim 9, wherein the first language model has a longer context window than the second language model.

13. The system of claim 9, wherein the first language model prompt describes a plurality of language model response types and instructs the first language model to return a language model response.

14. The system of claim 9, wherein the first language model prompt describes a plurality of API calls.

15. The system of claim 9, wherein the at least one server computer is configured to:

generate second context transfer information by processing the second session context with a fourth language model; and update the first session context to include a representation of the second context transfer information.

16. One or more non-transitory, computer-readable media comprising computer-executable instructions that, when executed, cause at least one processor to perform actions comprising:

creating a first session context for communications between a first language model and a first entity;

updating the first session context to include a representation of a first communication between the first language model and the first entity;

generating a first language model prompt using the first session context;

receiving a first language model response from the first language model using the first language model prompt;

causing a second communication to be transmitted to the first entity using the first language model response;

updating the first session context to include a representation of the second communication;

generating context transfer information by processing the first session context with a second language model;

creating a second session context for communications between a third language model and a second entity;

updating the second session context to include a representation of the context transfer information;

generating a second language model prompt using the second session context;

receiving a second language model response from the third language model using the second language model prompt; and causing a third communication to be transmitted to the second entity using the second language model response.

17. The one or more non-transitory, computer-readable media of claim 16, wherein the first entity is a user obtaining support from a company.

18. The one or more non-transitory, computer-readable media of claim 17, wherein the second entity is a human agent.

19. The one or more non-transitory, computer-readable media of claim 17, wherein the second entity is an API endpoint.

20. The one or more non-transitory, computer-readable media of claim 16, wherein the actions comprise:

generating second context transfer information by processing the second session context with a fourth language model; and updating the first session context to include a representation of the second context transfer information.

* * * * *